United States Patent [19]

Yagi et al.

[11] Patent Number: 4,518,055
[45] Date of Patent: May 21, 1985

[54] PUMP-DRIVE DEVICE OF POWER-ASSISTED STEERING SYSTEM

[75] Inventors: Eiji Yagi, Ayase; Yuji Kobari; Sadahiro Takahashi, both of Yokosuka, all of Japan

[73] Assignee: Nissan Motor Company, Limited, Yokohama, Japan

[21] Appl. No.: 474,425

[22] Filed: Mar. 11, 1983

[30] Foreign Application Priority Data

Apr. 8, 1982 [JP] Japan .................................. 57-59417
Jun. 22, 1982 [JP] Japan ............................ 57-93359[U]
Jun. 22, 1982 [JP] Japan ............................ 57-93360[U]

[51] Int. Cl.³ ............................................. B62D 5/08
[52] U.S. Cl. .................................. 180/142; 74/388 PS
[58] Field of Search ............... 180/132, 141, 142, 143; 74/388 PS

[56] References Cited

U.S. PATENT DOCUMENTS

| 4,056,160 | 11/1977 | Abels et al. | 180/143 |
| 4,300,650 | 11/1981 | Weber | 180/142 |
| 4,396,083 | 8/1983 | Wemberg | 180/143 |

FOREIGN PATENT DOCUMENTS 99859 8/1981 Japan .
22967 2/1982 Japan .

Primary Examiner—Joseph F. Peters, Jr.
Assistant Examiner—Kenneth R. Rice
Attorney, Agent, or Firm—Lane, Aitken & Kananen

[57] ABSTRACT

A pump-drive device of a power-assisted vehicle steering system, comprising a motor operative to drive a steering pressure pump, a first sensor for detecting vehicle speed and producing an output signal representative of the detected vehicle speed, a second sensor for detecting the motor output speed and producing an output signal representative of the detected motor output speed, a current control circuit responsive to the output signals from the first and second sensors, a main current supply line connected between a power source and the motor through the current control circuit, a bypass current supply line bypassing the current control circuit between the power source and the motor, the current control circuit being operative to produce an output signal to vary the current to be passed through the main current supply line on the basis of the output signals from the first and second sensors, a detecting unit responsive to a predetermined operative condition of the steering system and operative to produce an output signal when the steering system is in the predetermined operative condition, and a line shifting switch unit to provide electrical connection selectively between the power source and the motor selectively through the main and bypass current supply lines in the absence and presence, respectively, of the output signal from the detecting unit.

24 Claims, 21 Drawing Figures

PUMP-DRIVE DEVICE OF POWER-ASSISTED STEERING SYSTEM

FIELD OF THE INVENTION

The present invention relates to a pump-drive device for driving a steering pressure pump of a power-assisted steering system for a vehicle having steerable road wheels such as an automotive vehicle.

GENERAL BACKGROUND OF THE INVENTION

The reaction to be transmitted from the steered road wheels to the steering wheel of an automotive vehicle varies with the vehicle speed, generally decreasing as the vehicle speed increases and increasing as the vehicle speed decreases. In an automotive vehicle equipped with a power-assisted steering system in which fluid under pressure is used to boost the manual steering effort applied to the steering wheel, a considerably large amount of energy is thus consumed for driving the steering pressure pump especially at low vehicle speeds. If the steering pressure pump is driven by the internal combustion engine of the vehicle, the power output of the engine is thus consumed in notable proportion for the driving of the steering pressure pump and will cause obstruction to improving the fuel economy of the engine.

In an effort to solve such a problem, a power-assisted steering system has been proposed in which the steering pressure pump is put into operation to develop a steering assistance fluid pressure only when the vehicle is being steered and in which the hydraulic steering assistance is controlled to vary with vehicle speed. A typical example of such a power-assisted steering system is disclosed in Japanese Provisional Patent Publication No. 56-99859. Problems have however been still encountered in such a power-assisted steering system as will be discussed later. The present invention contemplates resolution of such problems.

SUMMARY OF THE INVENTION

In accordance with the present invention, there is provided a pump-drive device of a power-assisted steering system for an automotive vehicle, the steering system including a steering wheel operatively connected to a steering gear assembly and a steering pressure pump to supply fluid pressure to the steering gear assembly for reducing a manual steering effort applied to the steering wheel, comprising electric drive means operative to drive the steering pressure pump when electrically actuated; first sensing means for detecting driving speed of the vehicle and producing an output signal representative of the detected vehicle speed; second sensing means for detecting the output speed of the drive means and producing an output signal representative of the detected output speed of the drive means; a current control circuit responsive to the respective output signals from the first and second sensing means; a main current supply line electrically connected between a power source and the drive means through the current control circuit; a bypass current supply line electrically bypassing the current control circuit between a power source and the drive means; the current control circuit being operative to produce an output signal effective to vary the current to be passed through the main current supply line on the basis of the respective output signals from the first and second sensing means; detecting means responsive to a predetermined operative condition of the steering system and operative to produce an output signal when the steering system is in the predetermined operative condition; and line shifting switch means intervening between the power source and each of the main current supply line and the bypass current supply line and operative to provide electrical connection selectively between the power source and the main current supply line or between the power source and the bypass current supply line in the presence of the output signal from the detecting means.

BRIEF DESCRIPTION OF THE DRAWINGS

The drawbacks of a prior-art pump-drive device and the features and advantages of a pump-drive device according to the present invention will be more clearly understood from the following description taken in conjunction with the accompanying drawings in which like reference numerals designate similar or corresponding assemblies, units, and elements and in which.

Figure 10:
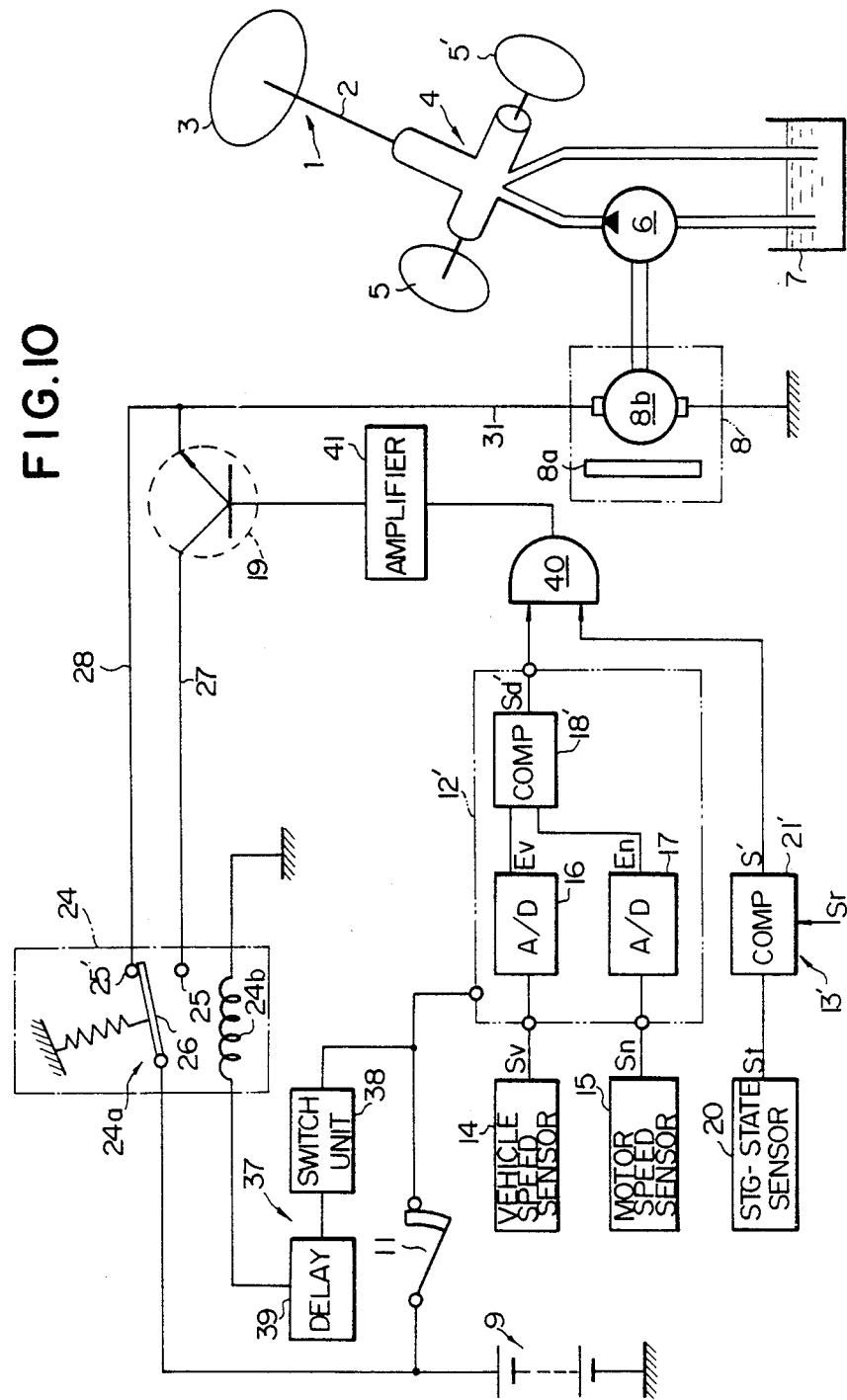
FIG. 10 is a schematic view showing a fourth preferred embodiment of a pump-drive device according to the present invention.
Figure 11:
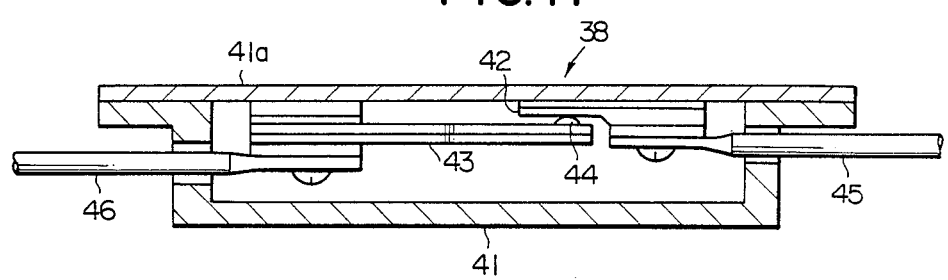
FIG. 11 is a sectional view showing the construction of a temperature-sensitive switch assembly included in the pump-drive device shown in FIG. 10.
Figure 14:
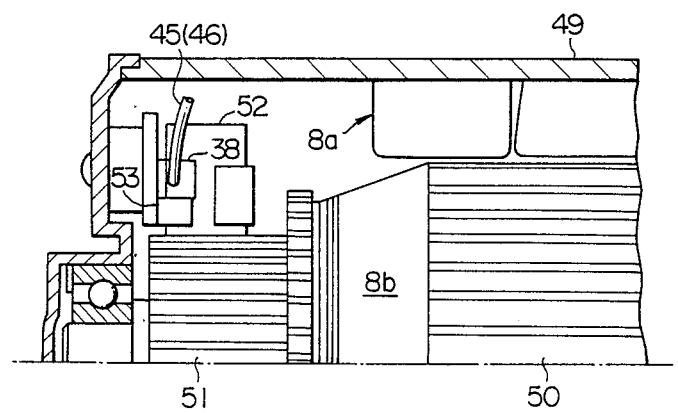
Figure 15:
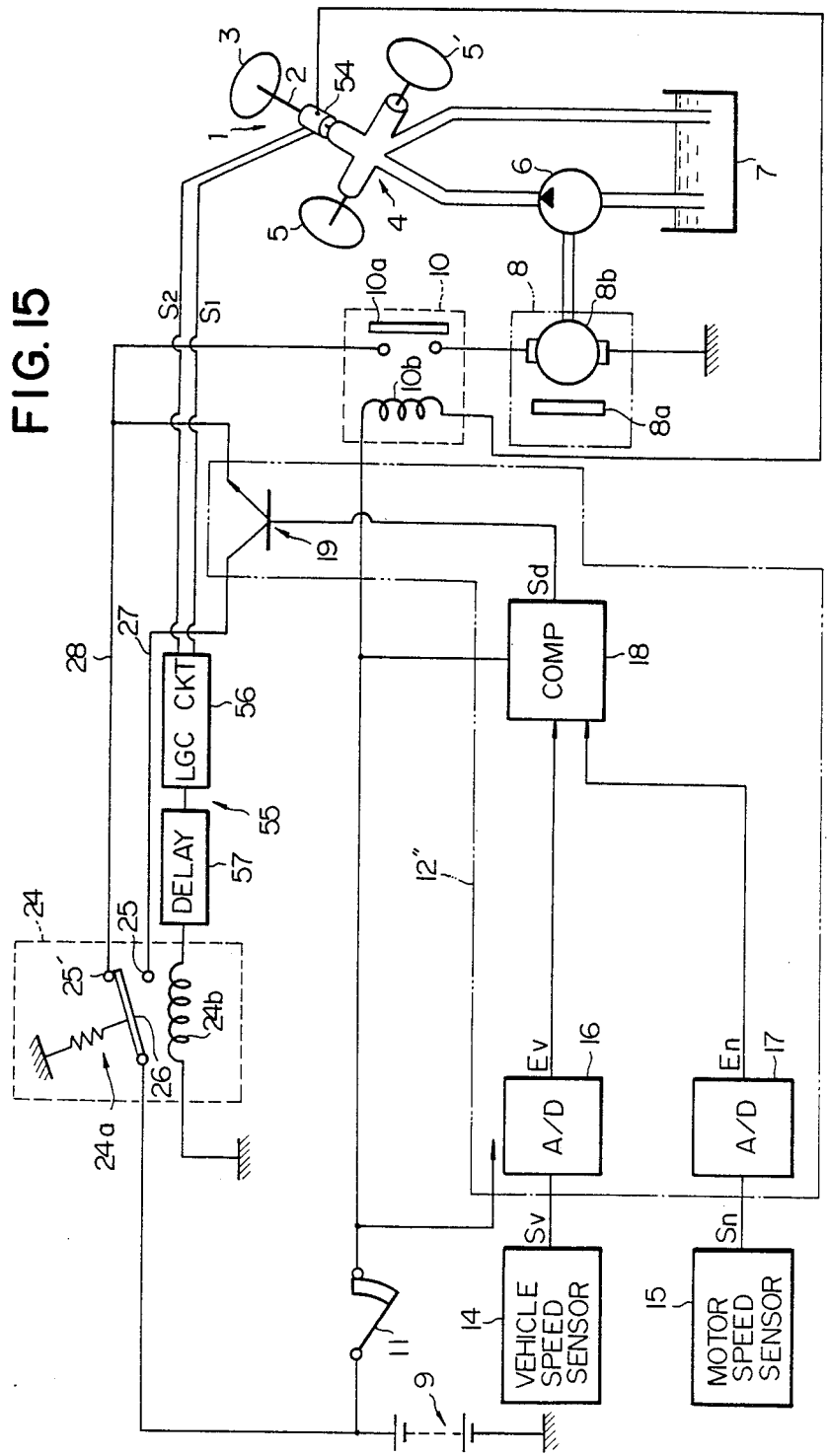
Figure 16:
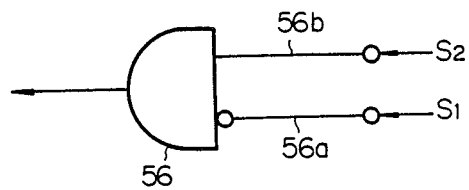
Figure 17:
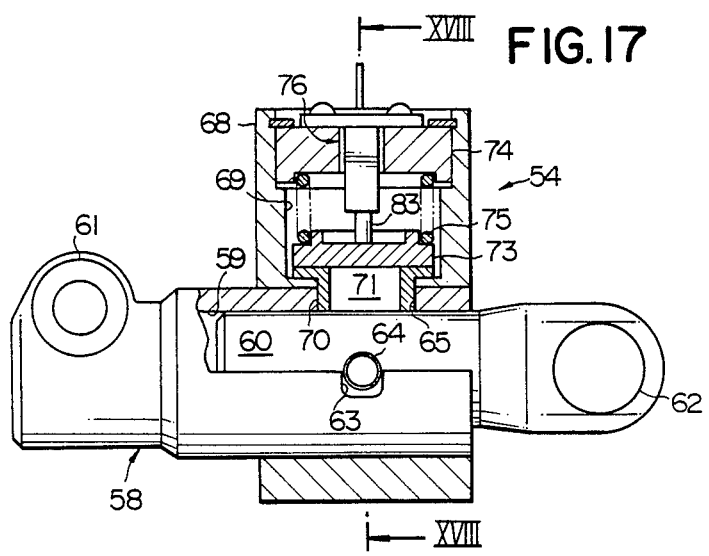
Figure 18:
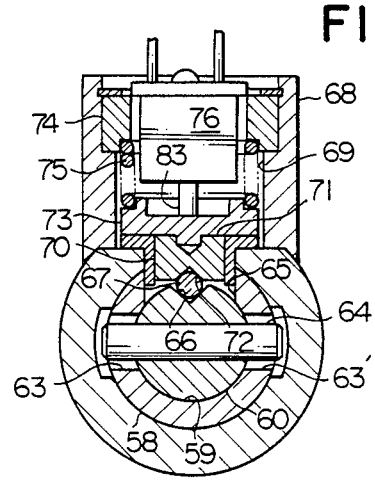
Figure 19:
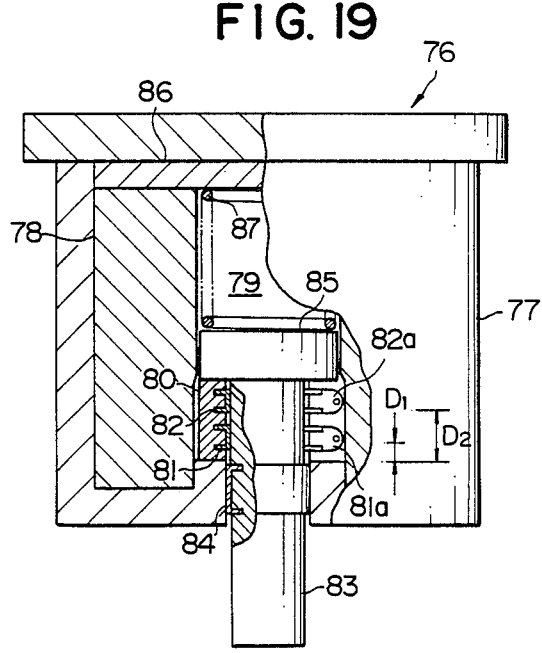
Figure 20:
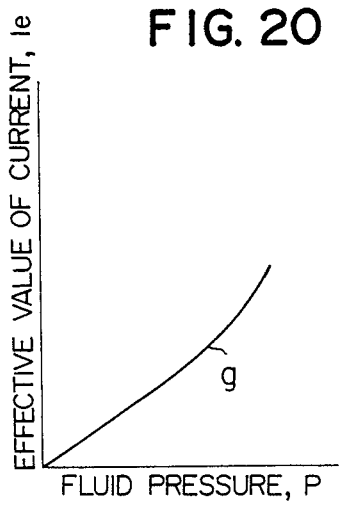
Figure 21:
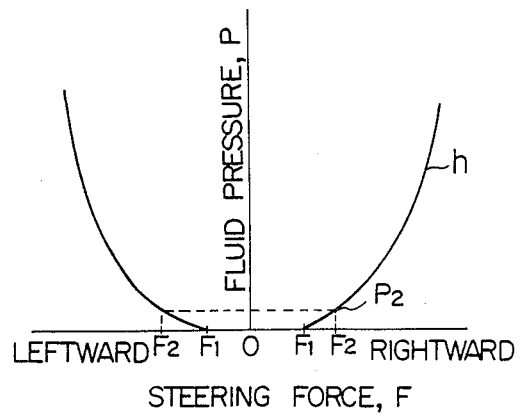

11 is used in combination with a transistor in the pump-drive device shown in FIG. 10;

FIG. 14 is a fragmentary sectional view showing an arrangement in which the temperature-sensitive switch assembly shown in FIG. 11 is used in combination with the pump-drive motor in the pump-drive device shown in FIG. 10;

FIG. 15 is a schematic view showing a fifth preferred embodiment of a pump-drive device according to the present invention;

FIG. 16 is a schematic view showing a specific example of a logic circuit included in the pump-drive device shown in FIG. 15;

FIG. 17 is a partially cut-away sectional view showing the construction of a steering-force sensor forming part of the pump-drive device shown in FIG. 15;

FIG. 18 is a sectional view taken on line XVIII—XVIII in FIG. 17;

FIG. 19 is a partially cut-away sectional view showing the construction of a displacement-responsive switch unit forming part of the steering-force sensor shown in FIGS. 17 and 18;

FIG. 20 is a graph showing the relationship between the fluid pressure developed by the steering-pressure pump and the current supplied to the pump-drive motor in the pump-drive device shown in FIG. 15; and FIG. 21 is a graph showing the relationship between the torque output of the pump-drive motor and the fluid pressure developed by the steering-pressure pump in the pump-drive device shown in FIG. 15.

DESCRIPTION OF THE PRIOR ART

Figure 1:
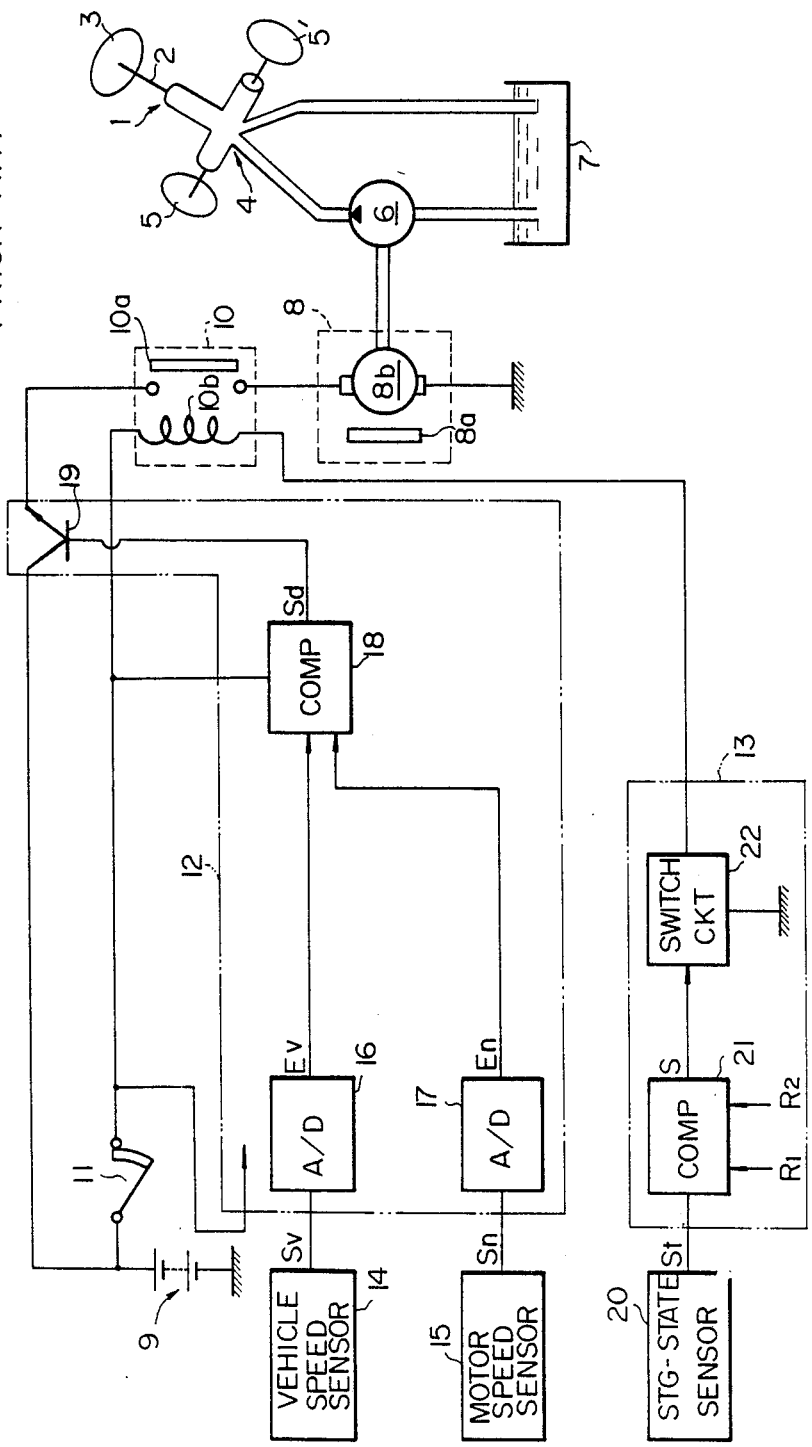
FIG. 1 is a schematic view showing a pump-drive device forming part of a prior-art power-assisted steering system.

In FIG. 1 is shown a power-assisted vehicle steering system including a pump-drive device disclosed in Japanese Provisional Patent Publication No. 56-99859. The steering system comprises a steering wheel and shaft assembly 1 including a steering shaft 2 carrying a steering wheel 3 at its upper end. A driver's manual steering effort applied to the steering wheel 3 is transmitted through the steering shaft 2 to a pressure-assisted steering gear assembly 4 and through the steering gear assembly 4 to the wheel axles of front road wheels 5 and 5'. The steering effort transmitted to the steering gear assembly 4 is boosted by a fluid pressure developed by a steering pressure pump 6 provided between the steering gear assembly 4 and a fluid reservoir 7. The steering pressure pump 6 is driven by a pump-drive motor 8 consisting of a stationary field magnet unit 8a and a rotatable armature unit 8b connected to a d.c. power source 9 across a relay unit 10. The relay unit 10 comprises a normally-open contact set 10a connected between the rotatable armature unit 8b of the pump-drive motor 8 and the power source 9 and an exciting coil 10b connected to the power source 9 across an ignition switch 11 for an internal combustion engine.

The contact set 10a of the relay unit 10 is actuated to open and close under the control of a current control circuit 12, and the current to be passed through the exciting coil 10b of the relay unit 10 is controlled by a current cut-off circuit 13. The current control circuit 12 is responsive to pulse signals supplied from a vehicle-speed sensor 14 and a motor-speed sensor 15. The vehicle-speed sensor 14 is adapted to detect driving speed of the vehicle and to produce an output pulse signal Sv representative of the detected vehicle speed, while the motor-speed sensor 15 is adapted to detect the output speed of the pump-drive motor 8 and to produce an output pulse signal Sn representative of the detected motor output speed. The output pulse signals Sv and Sn produced by the sensors 14 and 15 are fed to first and second digital-to-analog converters 16 and 17, respectively, and are converted into voltage signals Ev and En variable with the input pulse signals Sv and Sn, respectively. The voltage signals Ev and En are supplied to a comparator circuit 18 which is operative to produce an output pulse signal Sd having a duty factor variable with the relationship between the voltages signals Ev and En. The comparator circuit 18 has an output terminal connected to the base of a transistor 19 having its collector connected to the power source 9 and its emitter connected to the armature unit 8b of the pump-drive motor 8 across the contact set 10a of the relay unit 10. The transistor 19 serves as a chopper switch for the motor 8 and is operative to pass from the power source 9 to the contact set 10a therethrough an intermittent current variable in effective value with the duty factor of the pulse signal Sd applied to the base thereof.

On the other hand, the current cut-off circuit 13 has an input terminal connected to a steering-state sensor 20 to detect a state in which the vehicle is being steered, viz., the steering wheel 3 is being turned from or back toward the neutral or straight-ahead angular position. The steering-state sensor 20 is thus adapted to detect either an angle of turn of the steering wheel 3 from the straight-ahead angular position thereof or a manual steering effort applied to the steering wheel 3 and to produce an analog output signal St variable with the detected angle of turn of the steering wheel 3 from the straight-ahead angular position or the detected steering effort applied to the steering wheel 3. The signal St is fed to a comparator circuit 21 adapted to compare the analog input signal St with first and second reference signals $R_1$ and $R_2$ and to produce an output signal S when the input signal St is increasing beyond the first reference signal $R_1$ and to cease delivery of the signal S when the signal St is decreasing beyond the second reference signal $R_2$. The first and second reference signals $R_1$ and $R_2$ are representative of first and second predetermined values of the angle of turn of the steering wheel 3 or the manual steering effort applied to the steering wheel 3. The angle of turn of the steering wheel 3 or the manual steering effort applied to the steering wheel 3 as represented by the second reference signal $R_2$ is smaller than the value represented by the first reference signal $R_1$ and may equal or approximate naught. The comparator circuit 21 has an output terminal connected to a switch circuit 22, which has one terminal connected to the power source 9 through the exciting coil 10b of the relay unit 10 and across the ignition switch 11 and another terminal connected to ground. The switch circuit 22 is thus actuated to close in response to the signal S from the comparator circuit 21 and remains open in the absence of the signal S from the comparator circuit 21. The exciting coil 10b of the relay unit 10 is energized from the power source 9 when the steering wheel 3 is being manually turned away from the straight-ahead angular position beyond an angular position corresponding to the value represented by the first reference signal $R_1$ or is being turned back toward the straight-ahead angular position beyond an angular position corresponding to the value represented by the above mentioned second reference signal $R_2$.

Figure 2:
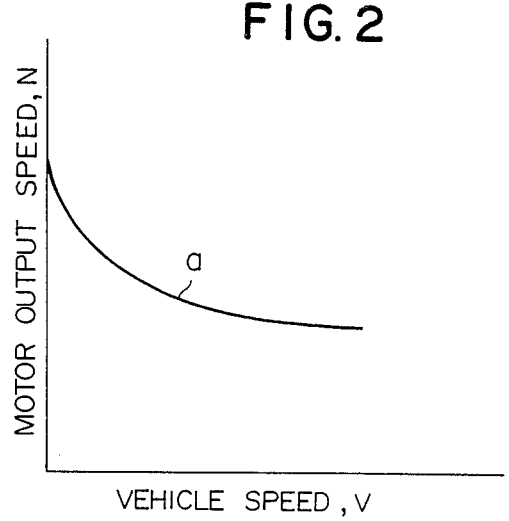
FIG. 2 is a graph showing the relationship between the vehicle speed and the output speed of a pump-drive motor operated in accordance with a predetermined schedule in the pump-drive device shown in FIG. 1.
Figure 3:
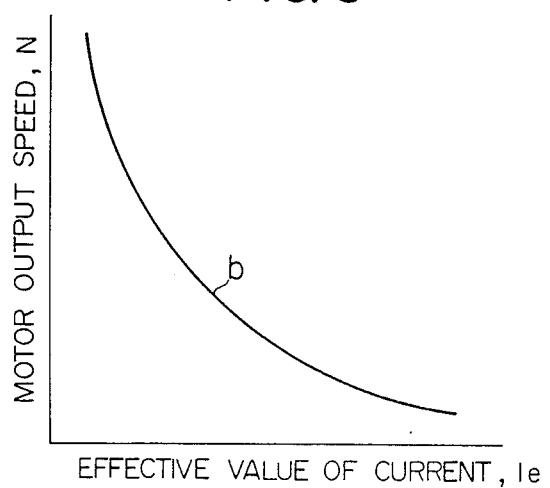
FIG. 3 is a graph showing an example of the intrinsic performance characteristics of the pump drive motor used in the prior-art pump-drive device of FIG. 1.

When the steering wheel 3 is maintained in the straight-ahead angular position thereof, the switch circuit 22 remains open in the absence of the signal S at the output terminal of the comparator circuit 21 so that the exciting coil 10b of the relay unit 10 is maintained de-energized. The contact set 10a of the relay unit 10 is therefore maintained open and, as a consequence, the armature unit 8b of the pump-drive motor 8 is disconnected from the power source 9. The pump-drive motor 8 being thus held at rest, the steering pressure pump 6 is maintained inoperative so that there is no fluid pressure developed by the steering pressure pump 6. When, on the other hand, the steering wheel 3 is being turned away from the straight-ahead angular position thereof beyond the angular position corresponding to the value represented by the first reference signal $R_1$ or is being turned back toward the angular position corresponding to the value represented by the second reference signal $R_2$, the switch circuit 22 is closed in the presence of the signal S at the output terminal of the comparator circuit 21 so that the exciting coil 10b of the relay unit 10 is energized from the power source 9. The contact set 10a of the relay unit 10 is therefore closed and, as a consequence, the armature unit 8b of the pump-drive motor 8 is energized from the power source 9. Under these conditions, the comparator circuit 18 produces an output pulse signal Sd effective to vary the effective value of the intermittent current through the transistor 19 in such a manner that the output speed N of the pump-drive motor 8 varies in predetermined relationship to the detected vehicle speed V as indicated by curve a in FIG. 2. As will be seen from the curve a, the relationship between the vehicle speed V and the motor output speed N thus controlled is such that the output speed N of the motor 8 increases and decreases as the detected vehicle speed V decreases and increases, respectively. Furthermore, the performance characteristics of the pump-drive motor 8 are such that the output speed N of the pump-drive motor 8 varies in inverse proportion to the effective value Ie of the current supplied to the motor 8 as indicated by curve b in FIG. 3. For this reason, the comparator circuit 18 of the current control circuit 12 is constructed and arranged so that the intermittent current to flow through the transistor 19 increases and decreases in effective value as the vehicle speed V represented by the voltage signal Ev increases and decreases, respectively. When the vehicle is being steered during cruising at high speeds, the pump-drive motor 8 thus operates at relatively low speeds and as a consequence the steering pressure pump 6 supplies fluid pressure at relatively low rates to the steering gear assembly 4.

Figure 4:
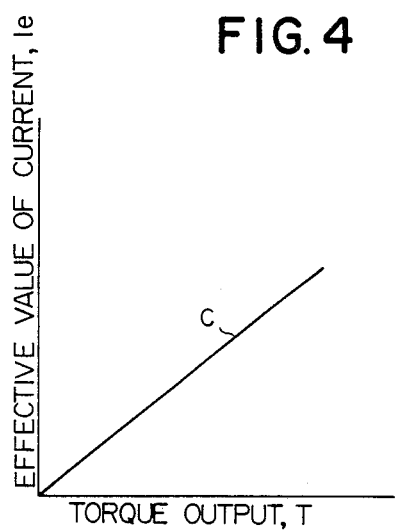
FIG. 4 is a graph showing the relationship between the torque output of the pump-drive motor and the current supplied to the motor in the pump-drive device shown in FIG. 1.

The effective value of the intermittent current to be supplied to the pump-drive motor 8 is controlled to vary in direct proportion to the torque output T of the motor 8 as indicated by plot c in FIG. 4. For this reason, the pulse signal Sd to be supplied to the base of the transistor 19 is produced in such a manner that the intermittent current which flows through the transistor 19 has a relatively large effective value when the motor 8 is being subjected to a relatively large load and is required to produce a relatively large torque output as when, for example, the dynamic viscosity of the working fluid in the fluid circuit is increased at low vehicle speed. In order to enable such a large current to pass reliably through the transistor 19, it is important that the transistor 19 have a sufficiently large performance capacity and be provided with a large-sized cooling device such as a heat sink. The use of such a transistor adds to the production cost of the steering system as a whole and the provision of the large-sized cooling device for the transistor restricts the placement of the pump-drive device in an automotive vehicle. The present invention contemplates elimination of these drawbacks of a prior-art pump-drive device for a power-assisted steering system.

DESCRIPTION OF THE PREFERRED EMBODIMENTS

Figure 5:
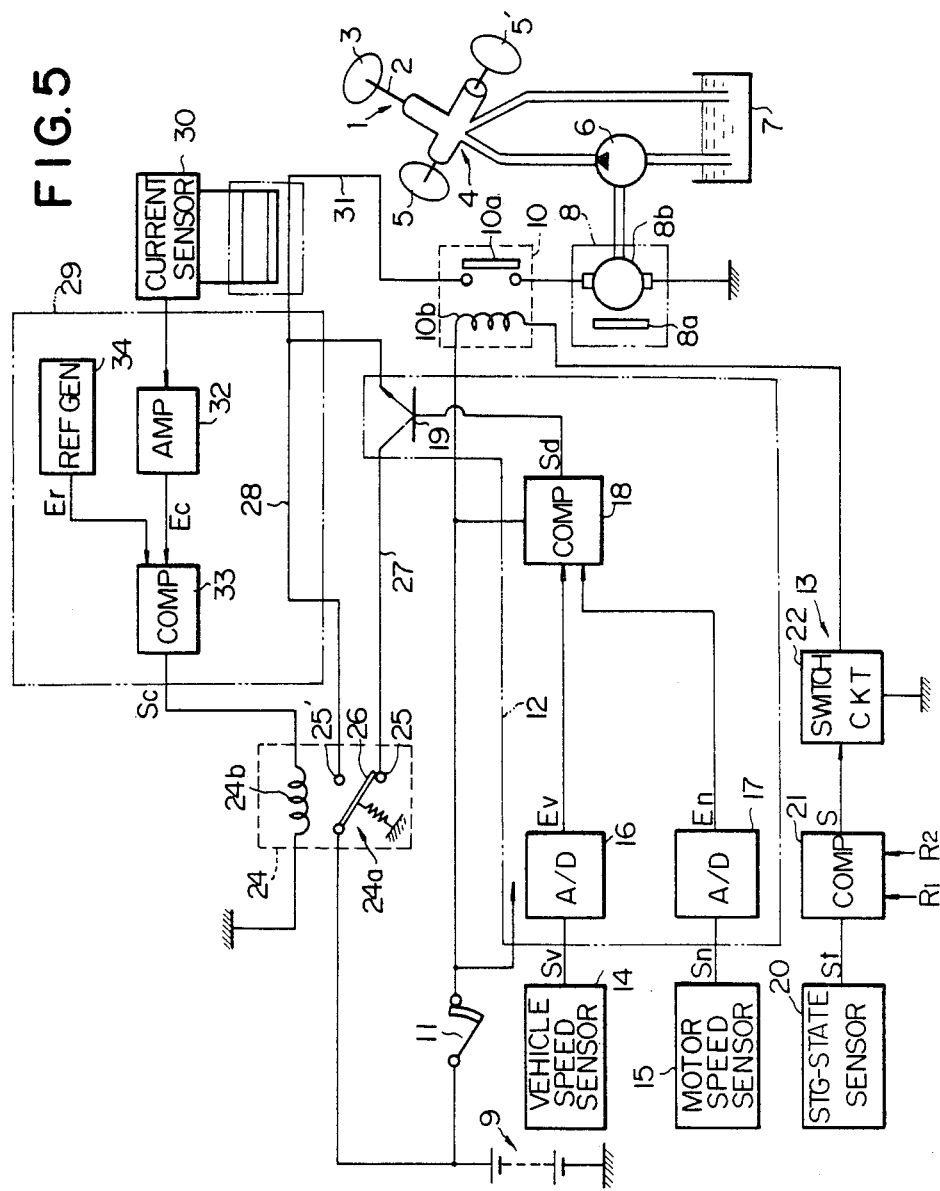
FIG. 5 is a schematic view showing a first preferred embodiment of a pump-drive device according to the present invention.

Referring to FIG. 5 of the drawings, a power-assisted steering system into which a pump-drive device embodying the present invention is to be incorporated is shown similar in itself to the steering system described with reference to FIG. 1 and thus comprises a steering wheel and shaft assembly 1 including a steering shaft 2 carrying a steering wheel 3 at its upper end. A driver's manual steering effort applied to the steering wheel 3 is transmitted through the steering shaft 2 to a pressure-assisted steering gear assembly 4. Though not shown in the drawings, the pressure-assisted steering gear assembly 4 has a mechanical input member coupled to the steering shaft 2 and a mechanical output member coupled to the wheel axles of front road wheels 5 and 5'. The power-assisted steering system is shown further comprising a steering pressure pump 6 having a suction port communicating with a fluid reservoir 7 and a delivery port communicating with the steering gear assembly 4. Since the construction and operation of the steering gear assembly 4 is well known in the art and is rather immaterial to the understanding of the subject matter of the present invention, no detailed description thereof will be herein incorporated.

The steering pressure pump 6 is driven by a separately-excited pump-drive motor 8 consisting essentially of a stationary field magnet unit 8a and a rotatable armature unit 8b including a current-carrying coil connected at one end to ground and at the other to a d.c. power source 9 across a main relay unit 10. The main relay unit 10 comprises a normally-open contact set 10a connected between the rotatable armature unit 8b of the pump-drive motor 8 and the power source 9 and an exciting coil 10b connected to the power source 9 across a switch 11 preferably constituted by an ignition switch which forms part of the spark ignition system of an internal combustion engine (not shown).

As in the arrangement described with reference to FIG. 1, the contact set 10a of the main relay unit 10 in the arrangement shown in FIG. 5 is actuated to open and close under the control of a current control circuit 12 and the current to be passed through the exciting coil 10b of the relay unit 1 is controlled by a current cut-off circuit 13. The current control circuit 12 is responsive to pulse signals respectively supplied from a vehicle-speed sensor 14 and a motor-speed sensor 15. The vehicle-speed sensor 14 is adapted to detect driving speed of the vehicle and to produce an output pulse signal Sv representative of the detected vehicle speed V, while the motor-speed sensor 15 is adapted to detect the output speed N of the pump-drive motor 8 and to produce an output pulse signal Sn representative of the detected motor output speed N. The output pulse signals Sv and Sn are fed to first and second digital-to-analog converters 16 and 17, respectively, and are thus converted into voltage signals Ev and En which are continuously variable with the pulse repetition frequencies of the input pulse signals Sv and Sn, respectively. The voltage signals Ev and En are supplied to a comparator circuit 18 responsive to the respective output signals Ev and En and operative to produce an output pulse signal Sd which has a duty factor variable with the relationship between the voltages of the signals Ev and En. The comparator circuit 18 has an output terminal connected to the base of a transistor 19 having its collector connected to the power source 9 and its emitter connected to the armature unit 8b of the pump-drive motor 8 across the contact set 10a of the main relay unit 10. The transistor 19 serves as a chopper switch for the pump-drive motor 8 and is thus operative to pass from the power source 9 to the contact set 10a therethrough an intermittent current which is variable in effective value with the duty factor of the signal Sd applied to the base thereof. As described in connection with the prior-art pump-drive device shown in FIG. 1, the pump-drive motor 8 has such intrinsic performance characteristics that the output speed N thereof varies in inverse proportion to the effective value Ie of the intermittent current supplied to the armature unit 8b thereof as previously discussed with reference to FIG. 3. The comparator circuit 18 is, for this reason, constructed and arranged so that the intermittent current to be passed through the transistor 19 to the armature unit 8b of the pump-drive motor 8 in response to the output signal Sd from the comparator circuit 18 increases and decreases in effective value as the vehicle speed V detected by the vehicle-speed sensor 14 increases and decreases, respectively. Thus, the intermittent current to be passed through the collector and emitter of the transistor 19 is controlled by the pulse signal Sd in such a manner that the output speed N of the pump-drive motor 8 and accordingly the delivery rate of the steering pressure pump 6 increase and decrease as the detected vehicle speed V decreases and increases, respectively, as indicated by the curve a in FIG. 2.

The current cut-off circuit 13 of the pump-drive device embodying the present invention is also similar in function to its counterpart in the prior-art pump-drive device described with reference to FIG. 1 and has an input terminal connected to a steering-state sensor 20 to detect a state in which the vehicle is being steered, viz., the steering wheel 3 is being manually turned from or back toward the neutral or straight-ahead angular position about the center axis of the steering shaft 2. The steering-state sensor 20 is thus provided in conjunction with the steering shaft and wheel assembly 1 or the steering gear assembly 4 and is adapted to detect either an angle of turn of the steering wheel 3 from the straight-ahead angular position thereof or a manual steering effort applied to the steering wheel 3 and to produce an analog output signal St variable with the detected angle of turn of the steering wheel 3 from the straight-ahead angular position or the detected steering effort applied to the steering wheel 3. The signal St is fed to a comparator circuit 21 adapted to compare the analog input signal St with first and second reference signals $R_1$ and $R_2$ and to produce an output signal S of, for example, a logic "1" value when the input signal St is increasing beyond the first reference signal $R_1$ and to cease delivery of the signal S when the signal St is decreasing beyond the second reference signal $R_2$. The first and second reference signals $R_1$ and $R_2$ are representative of first and second predetermined values of the angle of turn of the steering wheel 3 or the driver's manual steering effort applied to the steering wheel 3. The angle of turn of the steering wheel 3 or the manual steering effort applied to the steering wheel 3 as represented by the second reference signal $R_2$ is smaller than the value represented by the first reference signal $R_1$ and may equal or approximate naught, the comparator circuit 21 thus having a suitable hysteresis network incorporated therein. The comparator circuit 21 has an output terminal connected to a switch circuit 22, which has one terminal connected to the power source 9 through the exciting coil 10b of the main relay unit 10 and across the ignition switch 11 and another terminal connected to ground. The switch circuit 22 is thus actuated to close in response to the signal S supplied from the comparator circuit 21 and remains open in the absence of the signal S. The exciting coil 10b of the relay unit 10 is energized from the power source 9 when the steering wheel 3 is being manually turned away from the straight-ahead angular position beyond an angular position corresponding to the value represented by the above mentioned first reference signal $R_1$ or is being turned back toward the straight-ahead angular position beyond an angular position corresponding to the value represented by the above mentioned second reference signal $R_2$.

Figure 6:
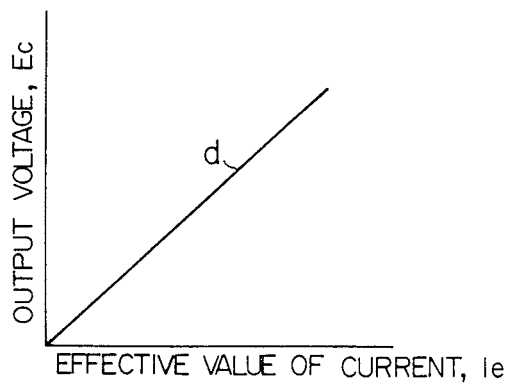
FIG. 6 is a graph showing the relationship between the current supplied to the pump-drive motor and the output voltage from a current sensor or detecting means included in the pump-drive device shown in FIG. 5.

The pump-drive device embodying the present invention further comprises a line shifting relay unit 24 which consists essentially of a normally-open contact set 24a and an exciting coil 24b. The contact set 24a is connected between the power source 9 and the armature unit 8b of the pump-drive motor 8 across the contact set 10a of the main relay unit 10 and comprises first and second stationary contact elements 25 and 25' connected to the collector and emitter, respectively, of the transistor 19, and a movable contact element 26 connected to the power source 9. The movable contact element 26 is movable between the positions respectively contacting the first and second stationary contact elements 25 and 25' and is biased to contact the first stationary contact element 25 by suitable biasing means. In the pump-drive device embodying the present invention, the line intervening between the first stationary contact element 25 of the line shifting relay unit 24 and the collector of the transistor 19 constitutes a main current supply line 27, while the line intervening between the second stationary contact element 25' of the line shifting relay unit 24 and the emitter of the transistor 19 constitutes a bypass current supply line 28. On the other hand, the exciting coil 24b of the line shifting relay unit 24 is grounded at one end and connected at the other to a switch circuit 29 which is adapted to determine whether the effective value Ie of the intermittent current to be supplied to the pump-drive motor 8 is larger or smaller than a predetermined value. The switch circuit 29 is thus provided in combination with a current sensor 30 which is arranged in conjunction with the armature unit 8b of the pump-drive motor 8 or, as shown, with a common current supply line 31 intervening between the armature unit 8b and each of the main and bypass current supply lines 27 and 28 as shown. The current sensor 30 is responsive to the magnetic field induced around the switch circuit 29 by the intermittent current flowing therethrough and is thus operative to produce an output voltage signal representative of the current inducing such a magnetic field and thus variable with the load on the pump-drive motor 8. The current sensor 30 of this nature may be constituted by a Hall generator. The voltage signal produced by the current sensor 30 is fed to the switch circuit 29, which comprises an amplifier 32 to amplify the signal from the sensor 30 into a voltage signal Ec, and a comparator circuit 33 having an input terminal connected to the amplifier 32. The voltage signal Ec produced by the amplifier 32 is variable in direct proportion to the effective value Ie of the intermittent current through the line 31 as indicated by plot d in FIG. 6. The comparator circuit 33 is operative to compare the variable voltage signal Ec with a reference signal Er supplied from a reference signal generator 34. The reference signal Er is representative of a predetermined effective value of the intermittent current to be supplied to the pump-drive motor 8. The comparator circuit 33 is thus further operative to produce an output signal Sc when the variable input signal Ec is higher in voltage than the reference signal Er. The output signal Sc from the comparator circuit 33 is passed through the exciting coil 24b of the line shifting relay unit 24 and energizes the coil 24b. When the exciting coil 24b of the line shifting relay unit 24 is energized, the movable contact element 26 of the relay unit 24 is caused to shift from the first stationary contact element 25 to the second stationary contact element 25'.

When, now, the steering wheel 3 is held in the straight-ahead angular position thereof or in an angular position short of the position corresponding to the value represented by the previously mentioned first reference signal $R_1$, the switch circuit 22 remains open in the absence of the signal S at the output terminal of the comparator circuit 21 so that the exciting coil 10b of the relay unit 10 is maintained de-energized. The contact set 10a of the relay unit 10 is therefore maintained open and, as a consequence, the armature unit 8b of the pump-drive motor 8 is disconnected from the power source 9. The pump-drive motor 8 being thus held at rest, the steering pressure pump 6 is maintained inoperative so that there is no fluid pressure developed by the pump 6. When, on the other hand, the steering wheel 3 is being turned away from the straight-ahead angular position thereof beyond the angular position corresponding to the value represented by the first reference signal $R_1$ or is being turned back toward the angular position corresponding to the value represented by the second reference signal $R_2$, the switch circuit 22 is closed in the presence of the signal S at the output terminal of the comparator circuit 21 so that the exciting coil 10b of the relay unit 10 is energized from the power source 9. The contact set 10a of the relay unit 10 is therefore closed and, as a consequence, the armature unit 8b of the pump-drive motor 8 is energized from the power source 9 so that the motor 8 drives the steering pressure pump 6 to supply steering assistance fluid pressure to the steering gear assembly 4.

On the other hand, the vehicle-speed sensor 14 is operative to detect the driving speed of the vehicle and, likewise, the motor-speed sensor 15 is operative to detect the output speed N of the pump-drive motor 8 thus held operative. Pulse signals Sv and Sn respectively having repetition frequencies variable with the detected vehicle speed V and the detected output speed N of the pump-drive motor 8 are thus produced by the sensors 14 and 15 and are converted into corresponding voltage signals Ev and En by the first and second digital-to-analog converters 16 and 17, respectively, of the current control circuit 12. The resultant voltage signals Ev and En are fed to the comparator circuit 18 and cause the comparator circuit 18 to produce an output pulse signal Sd which varies in duty factor with the difference between the two input voltage signals Ev and En. When the pump-drive motor 8 is held at rest as above described, the voltage signal En supplied from the second digital-to-analog converter 17 to the comparator circuit 18 is indicative of zero degrees of rotation of the motor output shaft so that the duty factor of the pulse signal Sd delivered from the comparator circuit 18 to the base of the transistor 19 varies only with the vehicle speed V represented by the voltage signal Ev. The transistor 19 is triggered to provide a conduction state between the collector and emitter thereof in response to the pulse signal Sd thus fed to the base thereof. When the pump-drive motor 8 is put into operation driving the steering pressure pump 6, the voltage signal En supplied from the first digital-to-analog converter 17 to the comparator circuit 18 varies in proportion to the output speed N of the motor 8 so that the duty factor of the pulse signal Sd delivered from the comparator circuit 18 to the transistor 19 varies with not only the vehicle speed V represented by the voltage signal Ev but the motor output speed N represented by the voltage signal En. When the load on the pump-drive motor 8 as represented by the variable voltage signal Ec supplied to the comparator circuit 33 is less than the predetermined value represented by the reference signal Er, the exciting coil 24b of the relay unit 24 remains de-energized in the absence of a signal Sc at the output terminal of the comparator circuit 33 so that the movable contact element 26 of the relay unit 24 is held in the position contacting the first stationary contact element 25 as shown. Under these conditions, electrical connection is established between the power source 9 and the armature unit 8b of the pump-drive motor 8 through the first stationary contact element 25 of the relay unit 24 and the collector and emitter of the transistor 19, viz., through the main current supply line 27, as well as the contact set 10a of the main relay unit 10. In response to the pulse signal Sd supplied to the base of the transistor 19 as above described, an intermittent current is therefore allowed to flow through the collector and emitter of the transistor 19 with an effective value which increases or decreases as the vehicle speed V increases and decreases, respectively. Thus, the pump-drive motor 8 operates in such a manner that the output speed N thereof increases and decreases as the detected vehicle speed V decreases and increases, respectively, as indicated by the curve a in FIG. 2. When the vehicle is being steered during cruising at high speeds, the pump-drive motor 8 operates at relatively low speeds and as a consequence the steering pressure pump 6 supplies fluid pressure at relatively low rates to the steering gear assembly 4. Conversely, the pump-drive motor 8 operates at relatively high speeds so that the steering pressure pump 6 supplies fluid pressure at relatively high rates to the steering gear assembly 4 when the vehicle is being steered during cruising at low speeds.

If the load on the pump-drive motor 8 and accordingly the torque output T of the motor 8 increase and as a consequence the output speed N of the motor 8 decreases, the comparator circuit 18 of the current control circuit 12 produces an output pulse signal Sd with an increasing duty factor, giving rise to an increase in the effective value Ie of the intermittent current to flow through the collector and emitter of the transistor 19. As the effective value Ie of the intermittent current supplied to the pump-drive motor 8 is thus increased under the control of the current control circuit 12 while the vehicle is being steered, the torque output T of the motor 8 increases in proportion to the effective value Ie of the intermittent current as will be understood from the curve c of FIG. 4, with the result that the output speed N of the pump-drive motor 8 is maintained constant without respect to the increase in the load on the motor 8.

The current supplied through the transistor 19 to the armature unit 8b of the pump-drive motor 8 thus increases in proportion as the load on the motor 8 increases. When the effective value Ie of the intermittent current supplied to the pump-drive motor 8 exceeds a predetermined value which corresponds to the value represented by the reference signal Er, the voltage signal Ec fed to the comparator circuit 33 of the switch circuit 29 becomes higher in voltage than the reference signal Er so that the comparator circuit 33 produces an output signal Sc energizing the exciting coil 24b of the line shifting relay unit 24. This causes the movable contact element 26 of the relay unit 24 to shift from the first stationary contact element 25 to the second stationary contact element 25', establishing electrical connection between the armature unit 8b of the pump-drive motor 8 and the power source 9 through the contact set 10a of the main relay unit 10 and the second stationary contact element 25' of the line shifting relay unit 24, viz., through the bypass current supply line 28. The pump-drive motor 8 is now energized from the power source 9 with a relatively large current which is not controlled by the current control circuit 12. Under these conditions, the pump-drive motor 8 depends for its operation on the particular performance characteristics thereof. The intrinsic performance characteristics of the motor 8 are such that are indicated by the curve a in FIG. 3. When the movable contact element 26 of the line shifting relay unit 24 is shifted from the first stationary contact element 25 to the second stationary contact element 25', the armature unit 8b of the pump-drive motor 8 is momentarily disconnected from the power source 9. Since the time duration of the interruption of the supply of power to the pump-drive motor 8 is practically of a negligible order and due to the force of inertia of the armature unit 8b, the motor 8 is permitted to operate continuously after the movable contact element 26 is shifted from the contact element 25 to the contact element 25'.

Figure 7:
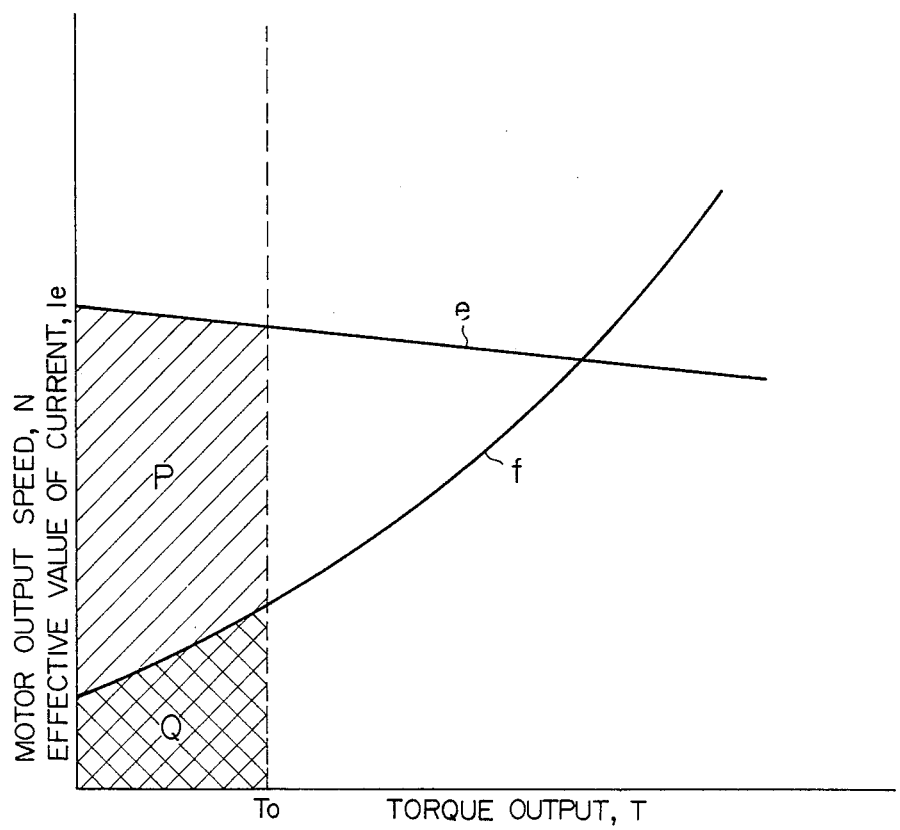
FIG. 7 is a view showing the relationship between the torque output of the pump-drive motor and the current supplied to the motor and the relationship between the torque output of the motor and the output speed of the motor in the pump-drive device shown in FIG. 5.

The modes of operation of the pump-drive motor 8 as described above are graphically shown in FIG. 7 in which plot e indicates the relationship between the torque output T and the output speed N of the motor 8 and plot f indicates the relationship between the torque output T of the motor 8 and the effective value Ie of the intermittent current supplied to the motor 8. When the torque output T of the motor 8 is less than a predetermined value To (which corresponds to the value represented by the reference signal Er), the intermittent current to be supplied to the motor 8 is controlled by the output pulse signal Sd from the comparator circuit 18 and has an effective value Ie which varies in relation to the vehicle speed V without respect to the torque output T of the motor 8. The output speed N of the motor 8 is therefore maintained substantially constant. Under these conditions, the effective value Ie of the intermittent current is controlled by the current control circuit 12 in such a manner as to vary within the ranges indicated by areas P and Q so that the output speed N of the motor 8 varies in predetermined relationship (indicated by the curve a in FIG. 2) to the vehicle speed V independently of the load on the motor 8 within a range indicated by the area P. The output speed N of the pump-drive motor 8 being thus controlled to vary with the vehicle speed V, the delivery rate of fluid from the steering pressure pump 6 varies in predetermined relationship to the vehicle speed V and is not affected by fluctuations in the load on the pump-drive motor 8 as caused by changes in the flow rate of the fluid through the control valve forming part of the steering gear assembly 4 or in the viscosity of the working fluid in the fluid system. If the reaction from the load wheels to the steering wheel 3 is varied in consequence of a change in the vehicle speed V, the output speed N of the pump-drive motor 8 and accordingly the steering assistance fluid pressure are varied with the vehicle speed V and give the vehicle driver a feeling of smoothness in steering the vehicle. When the torque output T of the pump-drive motor 8 is larger than the value To, the output speed N of the motor 8 and the effective value Ie of the intermittent current to be supplied to the motor 8 vary in predetermined relationship to each other in accordance with the intrinsic performance characteristics of the motor 8 per se as indicated by the curve a in FIG. 3. The transistor 19 thus bypassed when the pump-drive motor 8 is to be energized with a relatively large current need not have a power capacity competent with such a large current.

Figure 8:
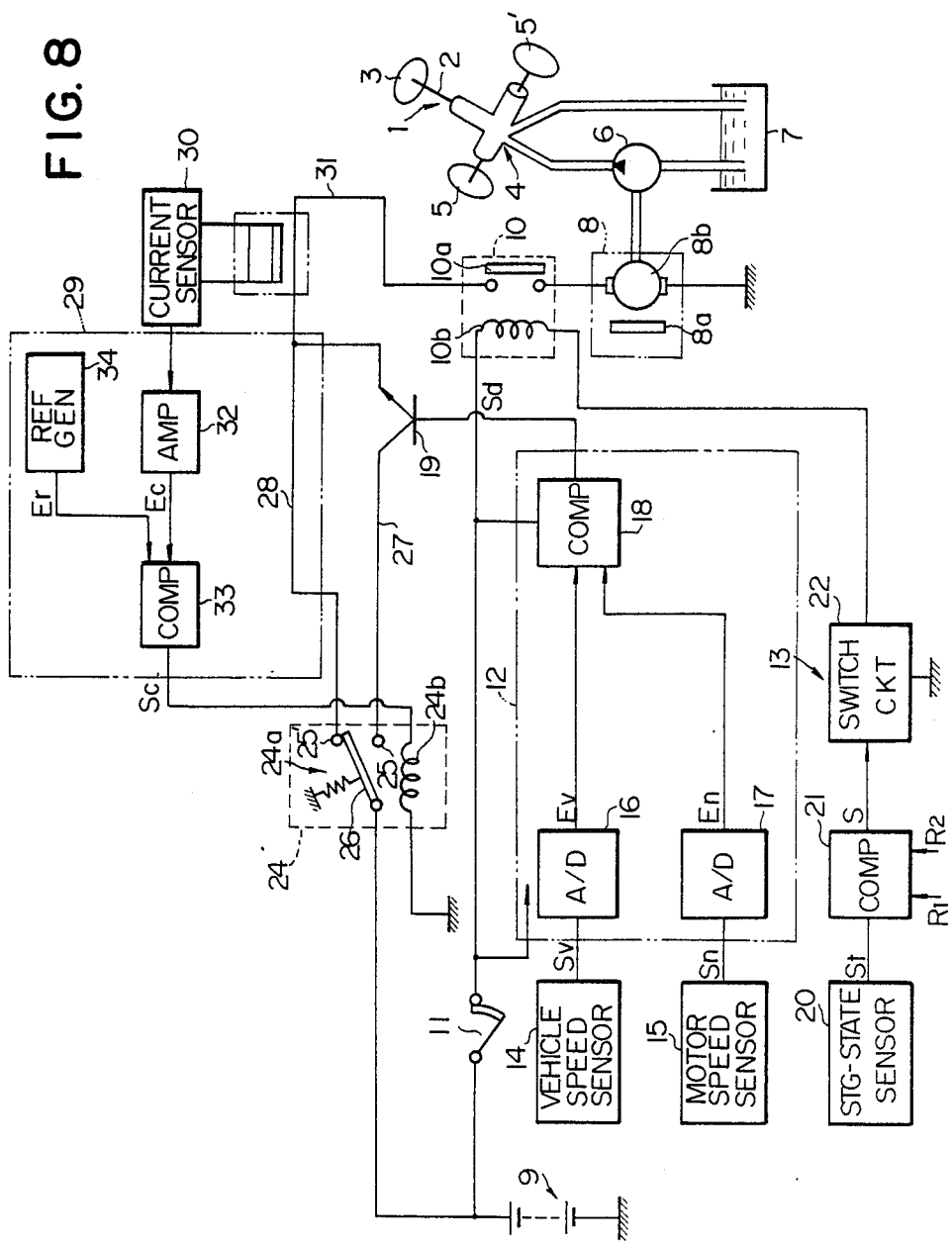
FIG. 8 is a schematic view showing a second preferred embodiment of a pump-drive device according to the present invention.

FIG. 8 of the drawings shows a modification of the embodiment hereinbefore described with reference to FIG. 5. In the modified embodiment shown in FIG. 8, the contact set 24a of the line shifting relay unit 24 is constructed and arranged so that the movable contact element 26 is urged to contact the second stationary contact element 25' and is caused to shift from the second stationary contact element 25' to the first stationary contact element 25 when the exciting coil 24b is energized. Thus, the comparator circuit 33 of the switch circuit 29 is adapted to compare the variable voltage signal Ec from the amplifier 32 with the reference signal Er constantly supplied from the reference signal generator 34 and to produce an output signal Sc when the variable input signal Ec is lower in voltage than the reference signal Er.

When the load on the pump-drive motor 8 is larger than a predetermined value, the exciting coil 24b of the relay unit 24 remains de-energized in the absence of the signal Sc at the output terminal of the comparator circuit 33 so that the movable contact element 26 of the relay unit 24 is held in the position contacting the second stationary contact element 25' as shown. Electrical connection is thus established between the armature unit 8b of the pump-drive motor 8 and the power source 9 through the bypass current supply line 28. When, on the other hand, the load on the pump-drive motor 8 is smaller than a predetermined value, then the comparator circuit 33 produces an output signal Sc and energizes the exciting coil 24b of the relay unit 24 so that the movable contact element 26 of the relay unit 24 is held in the position contacting the first stationary contact element 25, establishing electrical connection between the power source 9 and the armature unit 8b of the motor 8 through the main current supply line 27. The pump-drive device as described above is advantageous in that the pump-drive motor 8 is permitted to operate even when a failure is involved in the current sensor 30 or the switch circuit 29 since the relay unit 24 has its movable contact element 26 held in contact with the second stationary contact element 25' in the absence of a signal Sc at the output terminal of the comparator circuit 33.

Figure 9:
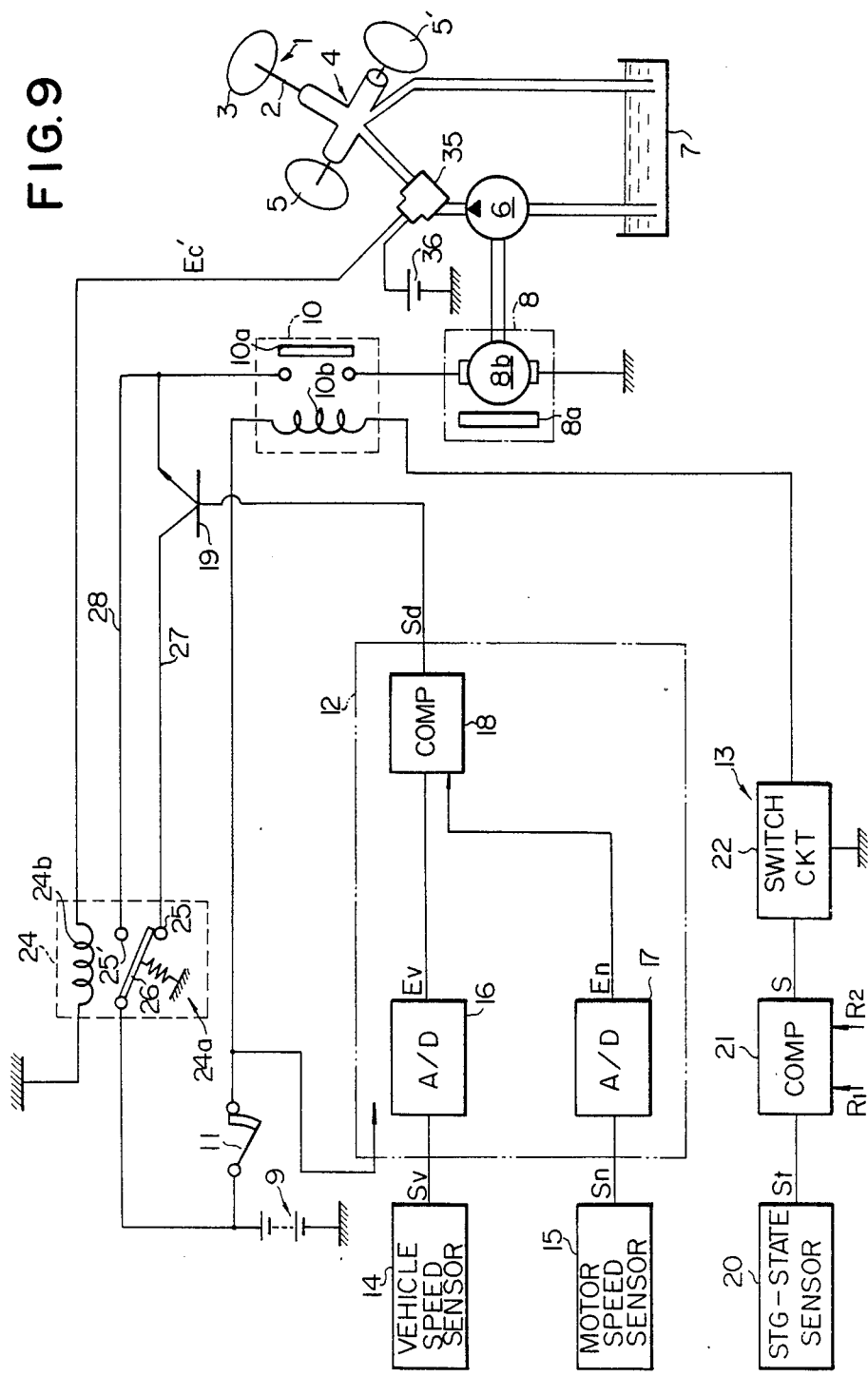
FIG. 9 is a schematic view showing a third preferred embodiment of a pump-drive device according to the present invention.

In each of the embodiments hereinbefore described with reference to FIGS. 5 and 8, the load on the pump-drive motor 8 is detected through detection of the effective value Ie of the intermittent current to be supplied to the armature unit 8b of the motor 8. If desired, however, the load on the pump-drive motor 8 may be detected through detection of the fluid pressure delivered from the steering pressure pump 6. FIG. 9 of the drawings shows such an embodiment of a pump-drive device according to the present invention. In the pump-drive device shown in FIG. 9, there is provided a pressure-sensitive switch 35 between a d.c. power source 36 and the exciting coil 24b of the line shifting relay unit 24. The pressure-sensitive switch 35 is responsive to the fluid pressure delivered from the steering-pressure pump 6 and is adapted to be normally open and to close in response to a fluid pressure higher than a predetermined value. Thus, the exciting coil 24b of the relay unit 24 is disconnected from the power source 36 and remains de-energized so that the movable contact element 26 of the relay unit 24 is held in contact with the first stationary contact element 25 when the fluid pressure delivered from the steering pressure pump 6 is lower than the predetermined value or when the pump-drive motor 8 and accordingly the steering pressure pump 6 are held at rest with the steering wheel 3 maintained in the straight-ahead angular position or an angular position close to the straight-ahead angular position thereof. When the fluid pressure delivered from the steering pressure pump 6 is higher than the predetermined value, then the pressure-sensitive switch 35 is caused to close and permits the exciting coil 24b to be energized from the power source 36, causing the movable contact element 26 of the relay unit 24 to shift from the first stationary contact element 25 to the second stationary contact element 25'. The embodiment hereinbefore described with reference to FIG. 9 is advantageous in that the pump-drive device as a whole can be constructed with simplicity and manufactured at low cost since merely the pressure-sensitive switch 35 is used in lieu of the various electrical units and elements constituting the current sensor 30 and the switch circuit 29 in each of the embodiments of FIGS. 5 and 8.

FIG. 10 of the drawings shows a fourth preferred embodiment of a pump-drive device according to the present invention. The embodiment herein shown is adapted to reduce the number of the component elements and units of each of the embodiments of FIGS. 5, 8 and 9 by eliminating the relay unit 10, the current sensor 30 and the switch circuit 29 incorporated therein. In the embodiment shown in FIG. 10, the armature unit 8b of the pump-drive motor 8 is connected at one end to ground and at the other to the d.c. power source 9 across the relay unit 24 which has its exciting coil 24b grounded at one end and connected at the other to a switch circuit 37. The switch circuit 37 is adapted to determine whether the effective value Ie of the intermittent current to be passed to the armature unit 8b of the pump-drive motor 8 is larger or smaller than a predetermined value and comprises a normally-closed temperature-sensitive switch unit 38 which functions as a sensor to detect the load on the pump-drive motor 8 and which is arranged in conjunction with the transistor 19 or the armature unit 8b of the pump-drive motor 8. The temperature-sensitive switch unit 38 is responsive to the temperature of the common current supply line 31 intervening between the armature unit 8b of the pump-drive motor 8 and each of the main and bypass current supply lines 27 and 28. The switch unit 38 is operative to detect the current through the common current supply line 31 through detection of the heat generated by the intermittent current which flows through the line 31 and to open in response to a temperature higher than a predetermined value. The switch unit 38 is connected between the power source 9 and the exciting coil 24b of the relay unit 24 across the ignition switch 11 and through a suitable delay circuit 39 intervening between the coil 24b and the switch unit 38. The delay circuit 39 may be constituted by a delay relay of the delayed pickup type adapted to close at a predetermined time interval after the coil thereof is energized, as is well known in the art.

On the other hand, the comparator circuit, now denoted by 18', of the current control circuit, denoted by 12', has an output terminal connected to one input terminal of a two-input logic "AND" gate circuit 40 and is operative to compare the respective output voltage signals Ev and En from the first and second digital-to-analog converters 16 and 17 with each other and to produce an output signal Sd' of a logic "1" value when the vehicle speed V represented by the voltage signal Ev and the motor output speed N represented by the voltage signal En are in predetermined relationship to each other. On the other hand, the comparator circuit, now denoted by 21', of the current cut-off circuit designated by 13' is responsive to the analog output signal St from the steering-state sensor 20 and is operative to compare the signal St with a reference signal Sr constantly impressed thereon. The reference signal Sr is representative of a predetermined manual steering effort applied to the steering wheel 3. Thus, the comparator circuit 21' produces an output signal S' of a logic "1" value when the variable input signal St is higher in magnitude than the reference signal Sr. The comparator circuit 21' has an output terminal connected to the other input terminal of the "AND" gate circuit 40. The "AND" gate circuit 40 in turn has an output terminal connected via an amplifier 41 to the base of the transistor 19. The logic "AND" gate circuit 40 is, thus, operative to pass the output pulse signal Sd' from the comparator circuit 18' to the base of the transistor 19 through the amplifier 41 in the presence of a signal S' of a logic "1" value at the output terminal of the comparator circuit 21'. When, now, the driver's manual steering effort applied to the steering wheel 3 is smaller than the predetermined value represented by the reference signal Sr constantly supplied to the comparator circuit 21', a signal S' of a logic "0" value is present at the output terminal of the comparator circuit 21' so that the pulse signal Sd' delivered from the comparator circuit 18' is not permitted to pass through the logic "AND" gate circuit 40. In the absence of a signal S' of a logic "1" value at the output terminal of the logic "AND" gate circuit 40, the transistor 19 is maintained in a non-conduction state. If the movable contact element 26 of the relay unit 24 is under these conditions held in the position contacting the first stationary contact element 25, the armature unit 8b of the pump-drive motor 8 is electrically disconnected from the power source 9. With the pump-drive motor 8 thus held at rest, the steering pressure pump 6 is maintained inoperative so that there is no fluid pressure developed by the steering pressure pump 6. There being no current flowing through the common current supply line 31 to the armature unit 8b of the pump-drive motor 8, the temperature-sensitive switch unit 38 is allowed to remain closed so that the exciting coil 24b of the relay unit 24 is kept energized from the power source 9 through the switch unit 38 and the delay circuit 39. The movable contact element 26 of the relay unit 24 is thus held in the position contacting the first stationary contact element 25 and the armature unit 8b of the pump-drive motor 8 is connected to the power source 9 through the emitter and collector of the transistor 19 and the first stationary contact element 25 of the relay unit 24, viz., through the main current supply line 27.

When, on the other hand, the steering wheel 3 is being turned with a manual steering effort larger than the predetermined value represented by the reference signal Sr, a signal S′ of a logic "1" value appears at the output terminal of the comparator circuit 21′ so that the pulse signal Sd′ delivered from the comparator circuit 18′ is permitted to pass through the logic "AND" gate circuit 40 and the amplifier 41 to the base of the transistor 19. The transistor 19 is thus shifted to a conduction state so that the armature unit 8b of the pump-drive motor 8 is energized from the power source 9 through the first stationary contact element 25 of the relay unit 24 and accordingly the main current supply line 27, actuating the pump-drive motor 8 to drive the steering pressure pump 6 to supply steering assistance fluid pressure to the steering gear assembly 4. The pump-drive motor 8 being thus operative, the voltage signal En supplied from the second digital-to-analog converter 17 to the comparator circuit 18′ varies in proportion to the output speed N of the motor 8 so that the duty factor of the pulse signal Sd′ varies with both the vehicle speed V represented by the voltage signal Ev and the voltage signal En. In response to the pulse signal Sd′ supplied to the base of the transistor 19 as above described, an intermittent current is allowed to flow through the collector and emitter of the transistor 19 with an effective value which increases or decreases as the vehicle speed V represented by the voltage signal Ev increases and decreases, respectively. Thus, the pump-drive motor 8 operates in such a manner that the output speed N thereof increases and decreases as the detected vehicle speed V decreases and increases, respectively, as indicated by the curve a in FIG. 2.

The current supplied through the transistor 19 to the armature unit 8b of the pump-drive motor 8 thus increases proportionately as the load on the motor 8 increases. When the effective value Ie of the intermittent current supplied to the pump-drive motor 8 exceeds a predetermined value and as a consequence the temperature of the line 31 becomes higher than the predetermined value dictated by the performance characteristics of the temperature-sensitive switch unit 38, the switch unit 38 is made open so that the exciting coil 24b of the relay unit 24 is disconnected from the power source 9 and is thus de-energized. The movable contact element 26 of the relay unit 24 is accordingly allowed to shift from the first stationary contact element 25 to the second stationary contact element 25′, establishing electrical connection between the armature unit 8b of the pump-drive motor 8 and the power source 9 through the second stationary contact element 25′ of the relay unit 24 and accordingly through the bypass current supply line 28. The pump-drive motor 8 is now energized from the power source 9 through the bypass current supply line 28 with a relatively large current which is not controlled by the current control circuit 12′. The pump-drive motor 8 thus depends for its operation on the particular performance characteristics thereof. If the intermittent current fed to the armature unit 8b of the pump-drive motor 8 thereafter decreases in effective value and as a consequence the temperature-sensitive switch unit 38 is allowed to close, the movable contact element 26 of the relay unit 24 is caused to shift from the second stationary contact element 25′ back to the first stationary contact element 25, establishing electrical connection between the armature unit 8b of the pump-drive motor 8 and the power source 9 through the collector and emitter of the transistor 19 and the first stationary contact element 25 of the relay unit 24, viz., through the main current supply line 27. The pump-drive motor 8 is again energized from the power source 9 through the main current supply line 27 with an intermittent current variable in effective value with the vehicle speed V.

FIG. 11 shows an example of the temperature-sensitive switch unit 38 included in the embodiment of the present invention as described above. As shown in FIG. 11, the switch unit 38 comprises a hollow switch housing 41 including a base plate 41a. The switch housing 41 has provided therein a stationary contact element 42 securely attached to the inner face of the base plate 41a, a bimetallic strip 43 secured at one end to the inner face of the base plate 41a and having a free end portion spaced apart from the stationary contact element 42, and a movable contact element 44 formed on or secured to the free end portion of the bimetallic strip 43. Lead wires 45 and 46 extend through wall portions of the switch housing 41 and are connected at their leading ends to the stationary contact element 42 and the bimetallic strip 43, respectively. The bimetallic strip 43 extends so that the movable contact element 44 thereon is held in contact with the stationary contact element 42, establishing electrical connection between the lead wires 45 and 46. One of the lead wires 45 and 46 is connected to the d.c. power source 9 across the ignition switch 11 and the other lead wire is connected to the exciting coil 24b of the relay unit 24 through the delay circuit 39 in the circuit arrangement shown in FIG. 10. The switch unit 38 is located in conjunction with the transistor 19 or the armature unit 8b of the pump-drive motor 8.

Figure 12:
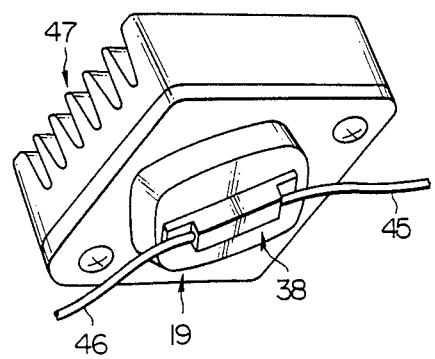
FIG. 12 is a perspective view showing an arrangement in which the temperature-sensitive switch assembly constructed as shown in FIG. 11 is used in combination with a transistor in the pump-drive device illustrated in FIG. 10.
Figure 13:
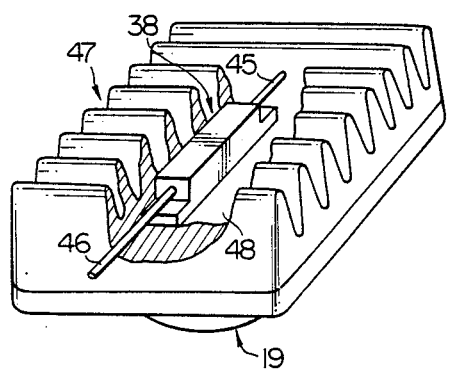
FIG. 13 is a perspective view showing another arrangement in which the switch assembly shown in FIG.

In FIG. 12, the switch unit 38 is shown provided in conjunction with the transistor 19 mounted on a heat absorptive device constituted by a heat sink 47. The switch unit 38 has its base plate 42 securely attached to the casing of the transistor 19 so that the transistor 19 is sandwiched between the switch unit 38 and the heat sink 47. When the switch unit 38 is provided in conjunction with the transistor 19, the switch 38 constructed as shown in FIG. 11 may be mounted directly on the heat sink 47. In this instance, a portion of the heat sink 47 may be removed to form a space to have the switch unit 38 accommodated therein as indicated at 48 in FIG. 13. In each of the switch arrangements shown in FIGS. 12 and 13, the switch unit 38 is responsive to the heat generated in the transistor 19 (in the case of the arrangement of FIG. 12) or transferred from the transistor 19 to the heat sink 47 (in the case of the arrangement of FIG. 13) by the intermittent current passed through the collector and emitter of the transistor 19. When the temperature of the heat transferred from the transistor 19 or the heat sink 47 to the switch unit 38 becomes higher than a predetermined value, the bimetallic strip 43 (FIG. 11) of the switch unit 38 is caused to warp away from the stationary contact element 42 so that the movable contact element 44 on the bimetallic strip 43 is disengaged from the stationary contact element 42 and causes the lead wires 45 and 46 to be electrically disconnected from each other. FIG. 14 shows an example of the arrangement in which the switch unit 38 constructed as described with reference to FIG. 11 is provided in conjunction with the pump-drive motor 8. In FIG. 14, the pump-drive motor 8 is shown including a housing structure 49 having the stationary field magnet unit 8a securely mounted therein. The rotatable armature unit 8b is coaxially surrounded by the field magnet unit 8a and largely consists of an armature core and coil assembly 50 and a commutator assembly 51 rotatable with the core and coil assembly 50. An electrically conductive brush 52 is supported on a brush support member 53 secured to the housing structure 49 and is held in slidable contact with the commutator assembly 51. The switch unit 38 is mounted on the brush support member 53 and is thus responsive to the heat generated around the brush support member 53 by the intermittent current which is to flow through the brush 52 to the commutator assembly 51. As well known in the art, the Joule heat given off from a conductor in which a current is flowing is proportional to the square value of the effective value Ie of the intermittent current. The temperature of the heat generated in the transistor 19 (FIGS. 12 and 13) or in the vicinity of the brush support member 53 (FIG. 14) thus varies substantially in direct proportion to the effective value Ie of the intermittent current through the transistor 19 or the brush 52, viz., the current to be supplied to the armature unit 8b of the pump-drive motor 8. The switch unit 38 in each of the arrangements shown in FIGS. 12, 13 and 14 is for this reason capable of reliably detecting the increase in the effective value of the intermittent current beyond a predetermined value.

FIG. 15 of the drawings shows a fifth preferred embodiment of a pump-drive device according to the present invention. The embodiment herein shown is adapted to reduce the number of the component elements and units of each of the embodiments of FIGS. 5, 8 and 9 by eliminating the current sensor 30 and the switch circuit 29 incorporated therein. In the embodiment shown in FIG. 15, the exciting coil 10b of the main relay unit 10 is connected at one end to the d.c. power source 9 across the ignition switch 11 and at the other to a steering-state sensor 54. The steering-state sensor 54 is provided in conjunction with the steering wheel and shaft assembly 1 and is adapted to produce a first output signal $S_1$ of, for example, a logic "0" value when the steering wheel 3 is turned from the straight-ahead angular position thereof with a steering effort larger than a first predetermined value $F_1$ and smaller than a second predetermined value $F_2$ larger than the first predetermined value $F_1$ and not only the first output signal $S_1$ but also a second output signal $S_2$ of, for example, a logic "1" value when the steering wheel 3 is turned from the straight-ahead angular position with an effort larger than the second predetermined value $F_2$. The first output signal $S_1$ or each of the first and second output signals $S_1$ and $S_2$ thus produced by the steering-state sensor 54 is fed to the exciting coil 10b of the main relay unit 10 and to a signal processing circuit 55. The signal processing circuit 55 comprises a logic circuit 56 having input terminals connected to the above described steering-state sensor 54 and being responsive to the first and second output signals $S_1$ and $S_2$, respectively, from the sensor 54, and an output terminal connected through a suitable delay circuit 57 to the exciting coil 24b of the line shifting relay unit 24 as shown. The logic circuit 56 is constituted by, for example, a logic "AND" gate circuit having a negative-logic first input terminal 56a and a positive-logic second input terminal 56b as shown in FIG. 16. The first and second output signals $S_1$ and $S_2$ from the steering-state sensor 54 are to be fed to these negative-logic and positive-logic first and second input terminals 56a and 56b, respectively, of the logic "AND" gate circuit 56. The logic "AND" gate circuit 56 is thus operative to deliver logic "1" value and "0" value output signals in the presence of logic "1" value and "0" value signals at its first and second input terminals, as tabulated below.

| Signals at 1st input terminal | Signals at 2nd input terminal | Output signals |
|---|---|---|
| 1 | 1 | 0 |
| 0 ($S_1$) | 1 | 1 |
| 1 | 0 ($S_2$) | — |
| 0 ($S_1$) | 0 ($S_2$) | 0 |

FIGS. 17 and 18 show an example of the construction of the steering-state sensor 54 forming part of the embodiment of FIG. 15. The steering-state sensor 54 comprises a hollow outer cylindrical member 58 formed with an axial bore 59 and an inner cylindrical member 60 rotatable about the center axis thereof and circumferentially slidable in the outer cylindrical member 58. The outer cylindrical member 58 is connected to the steering column (not shown) or the casing of the steering gear assembly 4 (FIG. 15) through a lower joint member 61 and is rotatable about the center axis thereof with respect to the body structure of the vehicle. The inner cylindrical member 60 is coupled to the steering shaft 2 (FIG. 15) through an upper joint member 62 and is rotatable with the steering shaft 2 about the center axis thereof in and with respect to the outer cylindrical member 58. The outer cylindrical member 58 has formed in its inner peripheral wall a pair of slots 63 and 63' which are elongated circumferentially of the cylindrical member 58 and which are located in diametrically opposite relationship to each other across the center axis of the axial bore 59 in the cylindrical member 58 as will be better seen from FIG. 18. A cross member 64 extends through the inner cylindrical member 60 diametrically of the cylindrical member 60 and has opposite end portions projecting into these slots 63 and 63', respectively. The outer cylindrical member 58 is further formed with a circular opening 65 which is open to the axial bore 59 radially of the cylindrical member 58. The inner cylindrical member 60 is formed with an axial groove 66 having a V-shaped cross section and open to the opening 65 in the cylindrical member 58, as will be seen from FIG. 18. The groove 66 is defined by two adjoining cam surfaces which are inclined to each other in symmetry about the center axis of the cylindrical member 60. The groove 66 has an elongated cylindrical coupling roller 67 rollably received on the inclined cam surfaces thus defining the groove 66.

The steering-state sensor 54 further comprises a hollow housing 68 having a generally cylindrical wall portion securely mounted on the outer cylindrical member 58 and having a cavity 69 axially open to the bore 59 in the cylindrical member 58 through the above mentioned opening 65 in the cylindrical member 58. The cavity 69 in the housing 68 has a center axis perpendicular to the center axis of the axial bore 59 in the cylindrical member 58. A flanged, cylindrical sleeve 70 axially projects from the cavity 69 in the housing 68 into the circular opening 65, the flange portion of the sleeve 70 being located at the axially innermost end of the cavity 69. A cylindrical slide coupling plunger 71 is axially slidable through the bore in the sleeve 70 and has an inner axial end portion projecting into the opening 65 in the outer cylindrical member 58 and formed with a groove 72 parallel with the groove 66 in the inner cylindrical member 60. The groove 72 is also defined by two adjoining cam surfaces which are inclined to each other. The cylindrical coupling roller 67 received on the inclined cam surfaces defining the groove 66 in the inner cylindrical member 60 is also rollably received on the inclined cam surfaces defining the groove 72 thus formed in the slide coupling plunger 71 so that the inner cylindrical member 60 and the coupling plunger 71 are held in engagement with each other through the coupling roller 67. The coupling plunger 71 has an outer axial end in the cavity 69 in the housing 68. When the steering wheel 3 (FIG. 15) is held in the straight-ahead angular position thereof, the inner cylindrical member 60 assumes with respect to the outer cylindrical member 58 and about the center axis of the cylindrical member 60 a neutral angular position in which the groove 66 is located in registry with the groove 72 so that the coupling roller 67 is received evenly on both of the inclined cam surfaces defining the groove 72 in the coupling plunger 71 as shown in FIG. 18. Under these conditions, the coupling plunger 71 is held in an axial position closest to the cylindrical member 60.

Within the cavity 69 in the housing 68 is further provided a generally disc-shaped plunger retainer 73 which is held in engagement with the coupling plunger 71 and which is thus axially movable therewith with respect to the housing 68, viz., toward and away from the grooved portion 66 of the inner cylindrical member 60. The plunger retainer 73 and accordingly the coupling plunger 71 are urged to move toward the grooved portion 66 of the inner cylindrical member 60 by suitable biasing means. In the arrangement shown in FIGS. 17 and 18, the biasing means is shown comprising an annular spring seat element 74 secured to the housing 68 and axially spaced apart outwardly from the plunger retainer 73, and a preloaded helical compression spring 75 which is seated at one end on the outer end face of the plunger retainer 73 and at the other on the inner end face of the spring seat element 74. The coupling plunger 71 is thus pressed over the inclined cam surfaces of the groove 72 against the coupling roller 67 so that the coupling roller 67 is received evenly on the two cam surfaces when the inner cylindrical member 60 is held in the above mentioned neutral angular position with respect to the outer cylindrical member 58. The compression spring 75 is in this fashion effective not only to urge the coupling plunger 71 to stay in the predetermined axial position closest to the inner cylindrical member 60 but to urge the cylindrical member 60 to stay in the neutral angular position with respect to the outer cylindrical member 58. The housing 68 has further provided in the cavity 69 thereof a displacement-responsive switch unit 76 responsive to the displacement of the plunger retainer 73 and accordingly of the coupling plunger 71 toward and away from the inner cylindrical member 60. The displacement-responsive switch unit 76 is operative to produce the above mentioned first output signal $S_1$ or first and second output signals $S_1$ and $S_2$ depending upon the axial position of the coupling plunger 71 with respect to the inner cylindrical member 60.

Turning to FIG. 19, such a displacement-responsive switch unit 76 comprises a hollow switch casing 77 secured to the housing 68 (FIGS. 17 and 18) through an opening formed in the above mentioned spring seat member 74. The switch casing 77 has fixedly mounted therein a collar 78 formed with an axial bore 79 aligned with the above described coupling plunger 71 and plunger retainer 73 (FIGS. 17 and 18). A hollow, cylindrical contact support member 80 is securely fitted to an end wall portion of the switch casing 77 and is fixedly located within the axial bore 79 in the collar 78. The contact support member 80 also has an axial bore aligned with the coupling plunger 71 and the plunger retainer 73 and is constructed of an electrically non-conductive material. The contact support member 80 has embedded therein first and second stationary contact elements 81 and 82 having respective annular portions on the inner peripheral surface of the support member 80 and thus exposed to the axial bore in the support member 80. The first and second stationary contact elements 81 and 82 are axially spaced apart a predetermined distance from each other in the contact support member 80 and have terminal portions 81a and 82a projecting radially outwardly from the support member 80. The switch unit 76 further comprises a contact carrier rod 83 axially movable through the axial bore in the contact support member 80 and having a movable contact element 84 embedded therein. The movable contact element 84 has an annular portion attached to the outer peripheral surface of the carrier rod 83 and is slidable on the respective annular exposed portions of the first and second stationary contact elements 81 and 82 depending upon the axial position of the rod 83 with respect to the contact support member 80. The contact carrier rod 83 is also constructed of an electrically non-conductive material and has a cylindrical land portion 85 in the axial bore 79 in the collar 78. The contact carrier rod 83 axially extends toward the previously described plunger retainer 73 and is engageable at its inner end with the plunger retainer 73 as shown in FIGS. 17 and 18. The carrier rod 83 is urged to axially move toward the inner cylindrical member 60 and is accordingly held in pressing engagement with the plunger retainer 73 by suitable biasing means. In FIG. 19, the biasing means is shown comprising a disc-shaped spring seat member 86 secured to the switch casing 77 and axially spaced apart outwardly from the contact support member 80, and a preloaded helical compression spring 87 which is seated at one end on the inner end face of the spring seat member 86 and at the other on the outer end face of the land portion 85 of the contact carrier rod 83. When the steering wheel 3 (FIG. 15) stays in the straight-ahead angular position thereof and accordingly the inner cylindrical member 60 assumes the neutral angular position with respect to the outer cylindrical member 58 with the coupling roller 67 evenly received on the two inclined cam surfaces of the groove 72 in the coupling plunger 71 as shown in FIG. 18, the contact carrier rod 83 is held, with respect to the contact support member 80, in a predetermined axial position having the movable contact element 84 spaced apart predetermined first and second distances $D_1$ and $D_2$ from the first and second stationary contact elements 81 and 82, respectively, on the contact support member 80, the predetermined second distance $D_2$ being longer than the predetermined first distance $D_1$. The contact carrier rod 83 assumes the particular axial position when the slide coupling plunger 71 (FIGS. 17 and 18) is held in the previously mentioned predetermined axial position closest to the inner cylindrical member 60. When the contact carrier rod 83 is axially moved over the first predetermined distance $D_1$ from such a predetermined axial position away from the inner cylindrical member 60 (FIGS. 17 and 18), the movable contact element 84 on the rod 83 is brought into sliding contact with the first stationary contact element 81 on the contact support member 80. The movable contact element 84 is brought into sliding contact with both the first stationary contact element 81 and the second stationary contact element 82 when the contact carrier rod 83 is axially moved away from the inner cylindrical member 60 over the second predetermined distance $D_2$ from the predetermined axial position thereof. Though not shown in the drawings, the terminal portions 81a and 82a of the first and second stationary contact elements 81 and 82 on the contact support member 80 are electrically connected to the negative-logic first input terminal 56a and positive-logic second input terminal 56b, respectively, of the logic "AND" gate circuit 56 shown in FIG. 16. The terminal portion 81a of the first stationary contact element 81 is further connected to the d.c. power source 9 through the exciting coil 10b of the main relay unit 10 and across the ignition switch 11 (FIG. 15). The movable contact element 84 on the contact carrier rod 83 has a terminal portion connected to ground.

When the steering wheel 3 stays in the straight-ahead angular position thereof and accordingly the inner cylindrical member 60 is held in the previously mentioned neutral angular position with respect to the outer cylindrical member 58, the groove 72 in the coupling plunger 71 is located in registry with the groove 66 in the inner cylindrical member 60 so that the coupling plunger 71 is held in the above mentioned predetermined axial position closest to the cylindrical member 60. The contact carrier rod 83 of the displacement-responsive switch unit 76 is accordingly held in the previously mentioned predetermined axial position with respect to the contact support member 80 and has the movable contact element 84 axially spaced apart from both of the first and second stationary contact elements 81 and 82 on the contact support member 80 as shown in FIG. 19. When the steering wheel 3 is manually driven to turn to steer the vehicle rightwardly or leftwardly, the inner cylindrical member 60 is caused to turn in either direction about the center axis thereof with respect to the outer cylindrical member 58 through an angle proportional to the driver's manual steering effort applied to the steering wheel 3. As the inner cylindrical member 60 is thus caused to turn with respect to the outer cylindrical member 58 and accordingly to the coupling plunger 71, the coupling roller 67 engaging both of the cylindrical member 60 and coupling plunger 71 is forced to roll on the inclined cam surfaces of the groove 72 in the coupling plunger 71 and causes the coupling plunger 71 to move from the predetermined axial position thereof away from the inner cylindrical member 60 against the force of the compression spring 75. As the coupling plunger 71 is moved away from the inner cylindrical member 60, the contact carrier rod 83 of the displacement-responsive switch unit 76 is caused to axially move against the force of the compression spring 87 from the predetermined axial position also away from the inner cylindrical member 60, viz., in a direction in which the movable contact element 84 on the rod 83 approaches the first and second stationary contact elements 81 and 82 on the contact support member 80. When the driver's manual steering effort applied to the steering wheel 3 reaches the previously mentioned predetermined first value $F_1$, the contact carrier rod 83 is moved the first predetermined distance $D_1$ from the initial position thereof and has the movable contact element 84 located on the first stationary contact element 81 on the contact support member 80, establishing electrical connection between the contact elements 81 and 84. When electrical connection is thus established between the contact elements 81 and 84, the first stationary contact element 81 is connected to ground through the movable contact element 84 so that the potential at the terminal portion 81a of the contact element 81 is maintained at a logic "0" value level. As the driver's manual steering effort applied to the steering wheel 3 is further increased and reaches the previously mentioned predetermined second value $F_2$, the contact carrier rod 83 is moved the second predetermined distance $D_2$ from the initial position thereof and has the movable contact element 84 located on both of the first and second stationary contact elements 81 and 82, establishing electrical connection between the contact element 84 and each of the contact elements 81 and 82. When electrical connection is thus provided between the contact element 84 and each of the contact elements 81 and 82, the first and second stationary contact elements 81 and 82 are connected to ground through the movable contact element 84 so that the potentials at the respective terminal portions 81a and 82a of the contact elements 81 and 82 are maintained at logic "0" value levels. While the driver's manual steering effort applied to the steering wheel 3 is increasing toward the second predetermined value $F_2$ so that the inner cylindrical member 60 is caused to turn with respect to the outer cylindrical member 58 until the contact carrier rod 83 has the movable contact element 84 brought into contact with the second stationary contact element 82, the cross member 64 fitted to the cylindrical member 60 has its opposite axial end portions moved through the slots 63 and 63', respectively, in the outer cylindrical member 58, which is accordingly permitted to stay with respect to the steering column and accordingly to the vehicle body structure. If the driver's manual steering effort applied to the steering wheel 3 is increased beyond the second predetermined value $F_2$, the cross member 64 has each of its opposite axial end portions brought into abutting contact with one of the edges defining each of the slots 63 and 63' and causes the outer cylindrical member 58 to turn together with the inner cylindrical member 60 about the center axis of the axial bore 59 in the outer cylindrical member 58.

When, now, the steering wheel 3 is maintained in the straight-ahead angular position thereof or in an angular position close to the straight-ahead angular position, the movable contact element 84 is electrically disconnected from each of the first and second stationary contact elements 81 and 82 as above described. Under these conditions, the exciting coil 10b of the main relay unit 10 (FIG. 15) is electrically disconnected from the d.c. power source 9 and is thus maintained de-energized and, furthermore, there are a signal $S_1$ of a logic "1" value present at the negative-logic input terminal 56a and a signal $S_2$ of a logic "1" value present at the positive-logic input terminal 56b of the logic "AND" gate circuit 56 (FIG. 16). As will be seen from the table hereinbefore presented, a signal of a logic "0" value is therefore produced at the output terminal of the logic "AND" gate circuit 56 so that the exciting coil 24b of the line shifting relay unit 24 remains de-energized. The movable contact element 26 of the line shifting relay unit 24 is thus held in the position contacting the second stationary contact element 25' of the relay unit 24 as shown in FIG. 15 so that the contact set 10a of the main relay unit 10 is connected to the power source 9 through the second stationary contact element 25' of the line shifting relay unit 24, viz., through the bypass current supply line 28. The armature unit 8b of the pump-drive motor 8 is however maintained de-energized with the exciting coil 10b of the main relay unit 10 kept de-energized as above noted. The pump-drive motor 8 is held at rest and accordingly the steering pressure pump 6 is maintained inoperative so that there is no fluid pressure developed by the steering pressure pump 6.

When the steering wheel 3 is being turned away from the straight-ahead angular position thereof with a driver's steering effort larger than the first predetermined value $F_1$ and smaller than the second predetermined value $F_2$, the contact carrier rod 83 (FIG. 19) is moved to an axial position having the movable contact element 84 located in contact with the first stationary contact element 81 and still spaced apart from the second stationary contact element 82. The first stationary contact element 81 is accordingly grounded through the movable contact element 84 so that a signal $S_1$ of a logic "0" value appears at the negative-logic first input terminal 56a of the logic "AND" gate circuit 56 with the signal of a logic "1" value continuedly applied to the positive-logic second input terminal 56b of the "AND" gate circuit 56. Under these conditions, the logic "AND" gate circuit 56 produces an output signal of a logic "1" value and causes the exciting coil 24b of the line shifting relay unit 24 to be energized with an output signal delivered from the delay circuit 57, causing the movable contact element 26 of the relay unit 24 to shift from the second stationary contact element 25' to the first stationary contact element 25. Electrical connection is thus established between the power source 9 and the contact set 10a of the main relay unit 10 through the first stationary contact element 25 of the line shifting relay unit 24 and the collector and emitter of the transistor 19, viz., through the main current supply line 27. The first stationary contact element 81 of the displacement-responsive switch unit 76 being grounded as above noted, the exciting coil 10b of the main relay unit 10 is electrically connected to and energized from the d.c. power source 9 through the ignition switch 11 so that the contact set 10a of the relay unit 10 is caused to close. The pump-drive motor 8 now has its armature unit 8b energized from the power source 9 through the first and second relay units 10 and 24 and the collector and emitter of the transistor 19 and is operative to drive the steering pressure pump 6 for supplying fluid pressure to the steering gear assembly 4.

The pulse signal Sd to be supplied to the base of the transistor 19 is produced in such a manner that the effective value Ie of the intermittent current to be passed through the collector and emitter of the transistor 19 to the pump-drive motor 8 is controlled to vary largely in direct proportion to the fluid pressure P delivered from the steering pressure pump 6 as indicated by plot g in FIG. 20. Whereas, the fluid pressure P to be supplied from the steering pressure pump 6 to the steering gear assembly 4 is controlled to vary with the driver's manual steering effort F applied to the steering wheel 3 and increases as the manual steering effort increases as indicated by plot h in FIG. 21. It therefore follows that the intermittent current to be supplied to the pump-drive motor 8 is controlled to have an effective value Ie variable generally in a quadratic fashion with the driver's manual steering effort F and increases as the manual steering effort F increases. Thus, the load on the pump-drive motor 8 varies in predetermined relationship to the driver's manual steering effort applied to the steering wheel 3. When the manual steering effort is increasing from the first predetermined value $F_1$ to the second predetermined value $F_2$, the fluid pressure P supplied from the steering pressure pump 6 to the steering gear assembly 4 increases from an approximately zero level to a certain value $P_2$ and accordingly the effective value Ie of the intermittent current supplied to the pump-drive motor 8 increases from an approximately zero level toward a certain value corresponding to the value $P_2$ of the fluid pressure P, as will be gathered from the curves g and h of FIGS. 20 and 21.

If the load on the pump-drive motor 8 and accordingly the torque output T of the motor 8 increases and as a consequence the output speed N of the motor 8 decreases, the comparator circuit 18 of the current control circuit 12 produces an output pulse signal Sd with an increasing duty factor, giving rise to an increase in the effective value Ie of the intermittent current to flow through the collector and emitter of the transistor 19. As the intermittent current is thus increased in effective value under the control of the current control circuit 12 while the vehicle is being steered, the torque output T of the motor 8 increases in proportion to the effective value Ie of the intermittent current as previously discussed with reference to FIG. 4. The result is that the output speed N of the pump-drive motor 8 is maintained constant without respect to the increase in the load on the motor 8.

As the driver's manual steering effort F applied to the steering wheel 3 is further increased and reaches the second predetermined value $F_2$, the contact carrier rod 83 of the displacement-responsive switch unit 76 (FIG. 19) is moved to an axial position having the movable contact element 84 located in contact with both of the first and second stationary contact elements 81 and 82. Each of the first and second stationary contact elements 81 and 82 being thus grounded through the movable contact element 84, the logic "AND" gate circuit 56 is supplied with signals $S_1$ and $S_2$ of logic "0" values at both of its negative-logic and positive-logic first and second input terminals 56a and 56b and produces an output signal of a logic "0" value. The exciting coil 24b of the line shifting relay unit 24 is therefore de-energized so that the movable contact element 26 of the relay unit 24 is accordingly allowed to shift from the first stationary contact element 25 to the second stationary contact element 25', establishing electrical connection between the armature unit 8b of the pump-drive motor 8 and the power source 9 through the second stationary contact element 25' of the relay unit 24 and accordingly through the bypass current supply line 28. The first stationary contact element 81 of the displacement-responsive switch unit 76 being kept grounded through the movable contact element 84, the armature unit 8b of the pump-drive motor 8 is now energized from the power source 9 through the bypass current supply line 28 in shunt across the transistor 19 with a relatively large current which is not controlled by the current control circuit 12".

If the driver's manual steering effort F applied to the steering wheel 3 thereafter decreases below the second predetermined value $F_2$, the logic "AND" gate circuit 56 produces a logic "1" value output signal so that the pump-drive motor 8 is energized with an intermittent current supplied thereto through the transistor 19 and having an effective value Ie is controlled to vary with the duty factor of the pulse signal Sd fed from the comparator circuit 18 to the base of the transistor 19.

What is claimed is:

1. A pump-drive device of a power-assisted steering system for an automotive vehicle, the steering system including a steering wheel operatively connected to a steering gear assembly and a steering pressure pump to supply fluid pressure to the steering gear assembly for reducing a manual steering effort applied to the steering wheel, comprising:

electric drive means operative to drive said steering pressure pump when electrically actuated;

first sensing means for detecting driving speed of the vehicle and producing an output signal representative of the detected vehicle speed;

second sensing means for detecting the output speed of said drive means and producing an output signal representative of the detected output speed of the drive means;

a current control circuit responsive to the respective output signals from the first and second sensing means;

a main current supply line electrically connected between a power source and said drive means through said current control circuit;

a bypass current supply line electrically bypassing said current control circuit between the power source and said drive means;

said current control circuit being operative to produce an output signal effective to vary the current to be passed through said main current supply line on the basis of the respective output signals from said first and second sensing means;

detecting means responsive to a predetermined operative condition of the steering system and operative to produce an output signal when the steering system is in the predetermined operative condition; and line shifting switch means intervening between said power source and each of said main and bypass current supply lines and operative to provide electrical connection between said power source and said drive means selectively through the main current supply line in the absence of the output signal from said detecting means and through said bypass current supply line in the presence of the output signal from said detecting means.

2. A pump-drive device as set forth in claim 1, in which said detecting means is operative to detect the load exerted on said drive means by said steering pressure pump and to produce an output signal representative of the detected load on the drive means, the pump-drive device further comprising a switch circuit responsive to the output signal from said detecting means and operative to compare the signal from the detecting means with a reference signal representative of a predetermined load on the drive means and to produce an output signal when the detected load represented by the signal from the detecting means is larger than the value represented by said reference signal, said line shifting switch means being held in a condition providing connection between said drive means and said power source through said main current supply line in the absence of the output signal from said switch circuit and through said bypass current supply line in the presence of the output signal from the switch circuit.

3. A pump-drive device as set forth in claim 2, in which said detecting means is operative to detect the current in a common current supply line electrically intervening between said drive means and each of said main and bypass current supply lines and to produce an output signal variable with the detected current in said common current supply line.

4. A pump-drive device as set forth in claim 2, in which said line shifting switch means comprises a first stationary contact element connected to said main current supply line, a second stationary contact element connected to said bypass current supply line, a movable contact element connected to said power source and shiftable between the first and second stationary contact elements, an exciting coil connected to said switch circuit and arranged to cause the movable contact element to shift from one of the first and second stationary contact elements to the other when energized in the presence of the output signal from the switch circuit.

5. A pump-drive device as set forth in claim 4, in which said line shifting switch means further comprises biasing means urging said movable contact element to remain in contact with said first stationary contact element.

6. A pump-drive device as set forth in claim 4, in which said line shifting switch means further comprises biasing means urging said movable contact element to remain in contact with said second stationary contact element.

7. A pump-drive device as set forth in claim 1, in which said detecting means is operative to detect the load exerted on said drive means by said steering pressure pump and to produce an output signal when the detected load on the drive means is larger than a predetermined value, said line shifting switch means being held in a condition providing connection between said drive means and said power source through said main current supply line in the absence of the output signal from said detecting means and through said bypass current supply line in the presence of the output signal from the detecting means.

8. A pump-drive device as set forth in claim 7, in which said detecting means is operative to detect the fluid pressure developed by said steering pressure pump and to produce an output signal when the detected fluid pressure is higher than a predetermined value.

9. A pump-drive device as set forth in any one of claims 2 to 8, further comprising main switch means electrically intervening between said drive means and said power source, third sensing means responsive to conditions in which said steering wheel is held in the straight-ahead angular position thereof or an angular position from the straight-ahead angular position, the third sensing means being operative to produce an output signal when the steering wheel is in said conditions, and a current cut-off circuit responsive to the output signal from the third sensing means and operative to cause said main switch means to close in the presence of the output signal from the third sensing means.

10. A pump-drive device as set forth in any one of claims 2 to 8, in which said current control circuit comprises a comparator circuit responsive to the respective output signals from said first and second sensing means and operative to produce pulse signals when the vehicle speed and the motor output speed respectively represented by the signals from the first and second sensing means are in predetermined relationship to each other, and a chopper switch having a control terminal connected to the output terminal of the comparator circuit, an input terminal connected to said main current supply line and an output terminal connected to the drive means.

11. A pump-drive device as set forth in claim 1, further comprising third sensing means operative to detect a manual steering effort applied to the steering wheel and to produce an output signal variable with the detected manual steering effort, a comparator circuit operative to compare the output signal from the third sensing means with a reference signal representative of a predetermined manual steering effort applied to the steering wheel and to produce an output signal with a predetermined logic value, said current control circuit comprising a comparator circuit responsive to the respective output signals from said first and second sensing means and operative to produce an output signal with a predetermined logic value when the signals from the first and second sensing means are in predetermined relationship to each other, and a logic "AND" gate circuit having input terminals respectively connected to the comparator circuits of the current control and current cut-off circuits and operative to produce said signal effective to vary the current to be passed through said main current supply line in the presence of the signals each with said predetermined logic value at both of the input terminals of the logic "AND" gate circuit.

12. A pump-drive device as set forth in claim 11, in which said detecting means is operative to detect the load exerted on said drive means by said steering pressure pump and to produce an output signal when the detected load on the drive means is larger than a predetermined value, said line shifting switch means being held in a condition providing connection between said power source and said drive means through said main current supply line in the absence of the output signal from said detecting means and through said bypass current supply line in the presence of the output signal from the detecting means.

13. A pump-drive device as set forth in claim 12, in which said detecting means is operative to detect the temperature of the heat generated by the current in a conductor electrically intervening between said drive means and each of said main and bypass current supply lines and to produce an output signal when the detected temperature is higher than a predetermined value.

14. A pump-drive device as set forth in claim 13, further comprising a chopper switch having a control terminal connected to the output terminal of said logic "AND" gate circuit, an input terminal connected to said main current supply line and an output terminal connected to the drive means.

15. A pump-drive device as set forth in claim 13, in which said detecting means is constituted by a switch unit comprising a hollow switch housing, a stationary contact element fixedly held in position within the switch housing, a bimetallic strip connected at one end to an inner face of the switch housing and having a free end portion spaced apart from the stationary contact element, a movable contact element fastened on the free end portion of the bimetallic strip and engageable with said stationary contact element, lead wires connected each at one end to the stationary contact element and the bimetallic strip, respectively, one of the lead wires being connected to said power source and the other lead wire being connected to said line shifting switch means.

16. A pump-drive device as set forth in claim 15, further comprising a transistor having a base connected to the output terminal of said logic "AND" gate circuit, a collector connected to said main current supply line and an emitter connected to the drive means.

17. A pump-drive device as set forth in claim 16, in which said switch unit is located in conjunction with one of said drive means and said transistor.

18. A pump-drive device as set forth in claim 17, in which said transistor is mounted on a heat absorptive device and in which said switch unit is securely attached to the casing of the transistor so that the transistor is sandwiched between the switch unit and the heat absorptive device.

19. A pump-drive device as set forth in claim 17, in which said pump-drive motor includes a housing structure having a stationary field magnet unit securely mounted therein, a rotatable armature unit coaxially surrounded by the field magnet unit and largely consisting of an armature core and coil assembly, a commutator assembly rotatable with the core and coil assembly and an electrically conductive brush supported on a brush support member secured to the housing structure and held in slidable contact with the commutator assembly, said switch unit being mounted on said brush support member.

20. A pump-drive device as set forth in claim 1, further comprising main switch means electrically intervening between said drive means and said power source, and third sensing means provided in conjunction with the steering wheel and shaft assembly and operative to produce a first output signal of a predetermined logic value when the steering wheel is being turned from the straight-ahead angular position thereof with a manual steering effort larger than a first predetermined value and smaller than a second predetermined value larger than the first predetermined value and the first output signal and a second output signal of a predetermined logic value when the steering wheel is turned from the straight-ahead angular position with a manual steering effort larger than the second predetermined value, the third sensing means being connected to said drive means so that the drive means is made operative in the presence of the first output signal or each of the first and second output signals from the third sensing means, and a signal processing circuit comprising a logic circuit having input terminals jointly connected to the said steering-state sensor and responsive to the first and second output signals, respectively, therefrom and an output terminal connected to said line shifting switch means, the logic circuit being operative to deliver an output signal of a predetermined logic value in the absence of said first output signal at one of its input terminals and in the presence of the second output signal at the other input terminal thereof, said line shifting switch means being in a condition providing connection between said drive means and said power source through said main current supply line in the presence of the output signal from said logic circuit and through said bypass current supply line in the absence of the output signal from the logic circuit.

21. A pump-drive device as set forth in claim 20, in which said current control circuit comprises a comparator circuit responsive to the respective output signals from said first and second sensing means and operative to produce pulse signals when the vehicle speed and the motor output speed respectively represented by the signals from the first and second sensing means are in predetermined relationship to each other, and a chopper switch having a control terminal connected to the output terminal of the comparator circuit, an input terminal connected to said main current supply line and an output terminal connected to the drive means.

22. A pump-drive device as set forth in claim 20, in which said third sensing means comprises a hollow outer cylindrical member formed with an axial bore and an opening open to said axial bore, the outer cylindrical member being rotatable about the center axis thereof with respect to the body structure of the vehicle; an inner cylindrical member rotatable about the center axis thereof and circumferentially slidable in the outer cylindrical member, the inner cylindrical member being rotatable with the steering shaft about the center axis thereof in and with respect to the outer cylindrical member and being formed with an axial groove having a V-shaped cross section and open to the opening in the outer cylindrical member, said groove being defined by two adjoining cam surfaces which are inclined to each other substantially in symmetry about the center axis of the inner cylindrical member; a cylindrical coupling roller rollably received on said inclined cam surfaces, a hollow housing formed with a cavity axially open to the bore in said outer cylindrical member through said opening; a coupling plunger slidable through said opening and formed with a groove substantially parallel with the groove in said inner cylindrical member, the groove in the coupling plunger being defined by two adjoining cam surfaces which are inclined to each other, said coupling roller being rollably received on the inclined cam surfaces defining the groove in the coupling plunger, the inner cylindrical member having with respect to the outer cylindrical member and about the center axis of the inner cylindrical member a neutral angular position in which the groove therein is located in registry with the groove in the coupling plunger so that said coupling roller is received evenly on both of the inclined cam surfaces defining the groove in the coupling plunger; a plunger retainer positioned within the cavity in said housing and held in engagement with said coupling plunger, the plunger retainer being movable with the coupling plunger with respect to said housing toward and away from the inner cylindrical member radially of the inner cylindrical member; biasing means urging the plunger retainer and the coupling plunger to move toward the inner cylindrical member so that the coupling plunger is pressed against said coupling roller over the inclined cam surfaces defining the groove and is urged to stay in a predetermined position closest to the inner cylindrical member with the coupling roller received evenly on the two cam surfaces of the coupling plunger when the inner cylindrical member is held in said neutral angular position with respect to the outer cylindrical member; and a displacement-responsive switch unit which is responsive to the displacement of each of the plunger retainer and the coupling plunger toward and away from the inner cylindrical member and which is operative to produce said first output signal or first and second output signals depending upon the position of the coupling plunger with respect to the inner cylindrical member.

23. A pump-drive device as set forth in claim 22, in which said displacement-responsive switch unit comprises an electrically non-conductive, hollow, cylindrical contact support member fixed with respect to said outer cylindrical member and formed with an axial bore substantially aligned with said coupling plunger and said plunger retainer, first and second stationary contact elements having respective annular portions which are fast on the inner peripheral surface of the support member and which are axially spaced apart a predetermined distance from each other, a contact carrier rod axially movable through the axial bore in the contact support member, a movable contact element having an annular portion which is fast on the outer peripheral surface of the carrier rod and which is slidable on the respective annular portions of the first and second stationary contact elements depending upon the axial position of the contact carrier rod with respect to the contact support member, the contact carrier rod axially extending toward said plunger retainer and being engageable at its leading end with the plunger retainer, and biasing means urging the carrier rod to axially move toward said inner cylindrical member and to stay in pressing engagement with the plunger retainer, said first and second stationary contact elements being electrically connected to the input terminals, respectively, of said logic circuit and the first stationary contact element being further connected to said power source through said switch means.

24. A pump-drive device as set forth in claim 23, in which said outer cylindrical member has formed in its inner peripheral wall a pair of slots which are elongated circumferentially of the outer cylindrical member and which are located in diametrically opposite relationship to each other across the center axis of the axial bore in the outer cylindrical member, said third sensing means further comprising a cross member extending diametrically through the inner cylindrical member and having opposite end portions projecting into said slots, respectively.

* * * * *